United States Patent
Kubo et al.

(10) Patent No.: US 12,129,402 B2
(45) Date of Patent: Oct. 29, 2024

(54) LIQUID COMPOSITION FOR OPTICAL FILTERS AND OPTICAL FILTER

(71) Applicant: Nippon Sheet Glass Company, Limited, Tokyo (JP)

(72) Inventors: Yuichiro Kubo, Tokyo (JP); Lei Cai, Kanagawa (JP); Hitomi Masuda, Tokyo (JP); Katsuhide Shimmo, Kanagawa (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 828 days.

(21) Appl. No.: 17/274,999

(22) PCT Filed: Aug. 27, 2019

(86) PCT No.: PCT/JP2019/033577
§ 371 (c)(1),
(2) Date: Mar. 10, 2021

(87) PCT Pub. No.: WO2020/054400
PCT Pub. Date: Mar. 19, 2020

(65) Prior Publication Data
US 2022/0057556 A1 Feb. 24, 2022

(30) Foreign Application Priority Data
Sep. 11, 2018 (JP) .................. 2018-169609

(51) Int. Cl.
*G02B 5/22* (2006.01)
*C08G 77/08* (2006.01)
(Continued)

(52) U.S. Cl.
CPC ............... *C09D 5/32* (2013.01); *C08G 77/08* (2013.01); *C08G 77/18* (2013.01); *C08K 5/5357* (2013.01); *C09D 183/06* (2013.01); *G02B 5/22* (2013.01)

(58) Field of Classification Search
CPC .......... G02B 5/22; C09D 5/32; C09D 183/06; C08K 5/5357; C08G 77/08; C08G 77/18
See application file for complete search history.

(56) References Cited

U.S. PATENT DOCUMENTS

2019/0346601 A1 11/2019 Kubo et al.
2020/0040161 A1* 2/2020 Kubo .................. C08K 5/5317
(Continued)

FOREIGN PATENT DOCUMENTS

JP  2009242650  10/2009
JP  2012185385  9/2012
(Continued)

OTHER PUBLICATIONS

International Search Report and Written Opinion issued for International Patent Application No. PCT/JP2019/033577, Date of mailing: Oct. 21, 2019, 9 pages including English translation of Search Report.

*Primary Examiner* — Bijan Ahvazi
(74) *Attorney, Agent, or Firm* — HSML P.C.

(57) ABSTRACT

The liquid composition for optical filters according to the present invention contains: a light absorber; at least one of an alkoxysilane and a hydrolysate of an alkoxysilane; a phosphoric acid ester; and a solvent. The light absorber is formed by a phosphonic acid having an aryl group bonded to a phosphorus atom and copper ion. In the liquid composition, a content of an organic solvent having a relative permittivity of 7 or less at 20° ° C. is 50 mass % or less.

22 Claims, 18 Drawing Sheets

(51) Int. Cl.
 *C08G 77/18* (2006.01)
 *C08K 5/5357* (2006.01)
 *C09D 5/32* (2006.01)
 *C09D 183/06* (2006.01)

(56) References Cited

U.S. PATENT DOCUMENTS

2020/0158930 A1\* 5/2020 Kubo ........................ G02B 5/22
2020/0233130 A1\* 7/2020 Kubo ..................... G03B 11/00

FOREIGN PATENT DOCUMENTS

| JP | 6232161 | 11/2017 |
| JP | 6267823 | 1/2018 |
| JP | 6339755 | 6/2018 |
| WO | 2018173386 | 9/2018 |

\* cited by examiner

LIQUID COMPOSITION FOR OPTICAL FILTERS AND OPTICAL FILTER

TECHNICAL FIELD

The present invention relates to a liquid composition for optical filters and an optical filter.

BACKGROUND ART

In imaging apparatuses employing a solid-state imaging sensor such as a charge coupled device (CCD) or a complementary metal oxide semiconductor (CMOS), any of various optical filters is disposed ahead of the solid-state imaging sensor in order to obtain images with good color reproduction. Solid-state imaging sensors generally have spectral sensitivity over a wide wavelength range from the ultraviolet to infrared regions. On the other hand, the visual sensitivity of humans lies solely in the visible region. Thus, a technique is known in which an optical filter blocking a portion of infrared light or ultraviolet light is disposed ahead of a solid-state imaging sensor in an imaging apparatus in order to allow the spectral sensitivity of the solid-state imaging sensor to approximate to the visual sensitivity of humans.

It has been common for such an optical filter to block infrared light or ultraviolet light by means of light reflection by a dielectric multilayer film. In recent years, optical filters including a light absorber-including film have been attracting attention. The transmittance properties of optical filters including a light absorber-including film are unlikely to be dependent on the incident angle, and this makes it possible to obtain favorable images with less color change even when light is obliquely incident on the optical filters in imaging apparatuses. Moreover, optical filters including a light absorber-including film are advantageous also in terms of reducing the size and thickness of imaging apparatuses.

For example, Patent Literature 1 describes an optical filter including a transparent dielectric substrate and a light-absorbing layer including a light absorber formed by a phosphonic acid having a phenyl group or a halogenated phenyl group and copper ion. Patent Literature 1 also describes a light-absorbing composition for forming the light-absorbing layer. An organic solvent such as toluene is used in preparation of the light-absorbing composition to prevent aggregation of the light absorber.

CITATION LIST

Patent Literature

Patent Literature 1: JP 6339755 B1

SUMMARY OF INVENTION

Technical Problem

The technique described in Patent Literature 1 leaves room for reducing the content of a low-polarity organic solvent such as toluene in the light-absorbing composition. Therefore, the present invention provides a liquid composition for optical filters, the liquid composition containing a given light absorber and being capable of decreasing the content of a low-polarity organic solvent.

Solution to Problem

The present invention provides a liquid composition for optical filters, containing:

a light absorber formed by a phosphonic acid having an aryl group bonded to a phosphorus atom and copper ion;
at least one of an alkoxysilane and a hydrolysate of an alkoxysilane;
a phosphoric acid ester; and
a solvent, wherein
a content of an organic solvent having a relative permittivity of 7 or less at 20° C. is 50 mass % or less.

Advantageous Effects of Invention

The above liquid composition contains the given light absorber and is capable of reducing the content of a low-polarity solvent.

DESCRIPTION OF EMBODIMENTS

Figure 1:
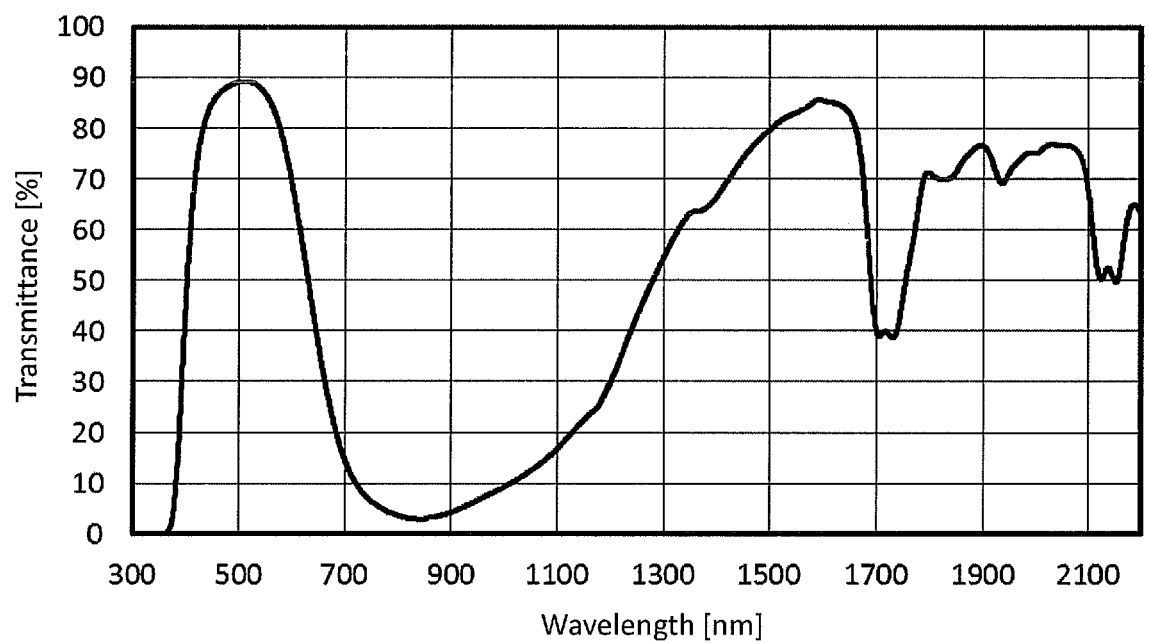
FIG. 1 shows a transmittance spectrum of a liquid composition 1.

A light absorber formed by a phosphonic acid having an aryl group bonded to a phosphorus atom and copper ion can aggregate or sediment in an organic solvent having a relatively high polarity, such as alcohol or tetrahydrofuran. It is therefore thought that the polarity of this light absorber is low enough to exhibit affinity to a low-polarity organic solvent such as toluene and such a low-polarity organic solvent is necessary for good dispersion of the light absorber. The phrase "enough to exhibit affinity" covers a state where the light absorber is dispersed to allow the use of the light absorber for a desired purpose. Low-polarity organic solvents commonly have a low relative permittivity, and toluene has a relative permittivity of 2.38 at 23ºC.

From the viewpoint of reducing the environmental impact, the amount of an organic solvent, such as toluene and xylene, is desirably decreased. In other words, the amount of an organic solvent having a relative permittivity of 7 or less at 20° C. is desirably decreased. Therefore, the present inventors made intensive studies to discover a technique for decreasing the content of an organic solvent having a low relative permittivity in a liquid composition for optical filters, the liquid composition containing the above-described light absorber. Through much trial and error, the present inventors have newly found that the content of an organic solvent having a low relative permittivity, such as toluene or xylene, can be decreased when a liquid composition for optical filters contains, in addition to a phosphoric acid ester, at least one of an alkoxysilane and a hydrolysate of an alkoxysilane. Based on this new finding, the present inventors have invented the liquid composition for optical filters according to the present invention.

Hereinafter, embodiments of the present invention will be described. The following description is directed to some examples of the present invention, and the present invention is not limited by these examples.

The liquid composition for optical filters according to the present invention contains: a light absorber; at least one of an alkoxysilane and a hydrolysate of an alkoxysilane; a phosphoric acid ester; and a solvent. The light absorber is formed by a phosphonic acid having an aryl group bonded to a phosphorus atom and copper ion. In the liquid composition, a content of an organic solvent having a relative permittivity of 7 or less at 20° C. is 50 mass % or less.

Since the alkoxysilane and the hydrolysate of an alkoxysilane have low polarity, the alkoxysilane is considered likely to be present around the light absorber in the liquid composition. Based on the reactivity of an alkoxy group in the alkoxysilane, partial hydrolysis of the alkoxysilane is thought to occur to yield a hydrophilic group such as a silanol group. This is thought to allow the light absorber to be present in a solvent having a relatively high polarity without forming an aggregation. It is therefore considered that the content of the organic solvent having a relative permittivity of 7 or less at 20° C. can be decreased to 50 mass % or less in the liquid composition.

The content of the organic solvent having a relative permittivity of 7 or less at 20° C. is desirably 50 mass % or less and more desirably 20 mass % or less. Furthermore, the content of an organic solvent having a relative permittivity of 3 or less at 20° C. is desirably 20 mass % or less and more desirably 10 mass % or less in the liquid composition.

The alkoxysilane and the hydrolysate of an alkoxysilane have, for example, a non-reactive hydrophobic group bonded to a silicon atom. In other words, the alkoxysilane and the hydrolysate of an alkoxysilane can be dialkoxysilane having a non reactive hydrophobic group, trialkoxysilane having a non reactive hydrophobic group, and their hydrolysates. In this case, the alkoxysilane and the hydrolysate of an alkoxysilane are likely to be present around the light absorber. Moreover, the non reactive hydrophobic group exerts a steric hindrance-like action and the alkoxysilane and the hydrolysate of an alkoxysilane can hinder aggregation of the light absorber. The non-reactive hydrophobic group is, for example, but not particularly limited to, an alkyl group such as a methyl group or an aryl group such as a phenyl group.

Examples of the alkoxysilane and the hydrolysate of an alkoxysilane include tetramethoxysilane, tetraethoxysilane, methyltrimethoxysilane, methyltriethoxysilane, dimethyldiethoxysilane, dimethyldimethoxysilane, phenyltrimethoxysilane, phenyltriethoxysilane, 3-glycidoxypropyltrimethoxysilane, 3-glycidoxypropyltriethoxysilane, 3-glycidoxypropylmethyldiethoxysilane, and their hydrolysates.

The solvent contained in the liquid composition contains, for example, an organic solvent (main solvent) having a relative permittivity of more than 7 at 20° C. By virtue of the action of the alkoxysilane and the hydrolysate of an alkoxysilane, as described above, aggregation of the light absorber can be prevented even with the use of such an organic solvent.

The main solvent may have a relative permittivity of, for example, 7 to 40 at 20° C. Additionally, the main solvent is desirably not prone to volatilization from the liquid composition. From this viewpoint, the main solvent has a boiling point of, for example, 100° C. or higher. The main solvent is, for example, but not particularly limited to, cyclopentanone (relative permittivity at 20° C.: 13.58; boiling point: about 131ºC) or cyclohexanone (relative permittivity at 20° C.: 16.1; boiling point: about 155° C.).

The phosphoric acid ester contained in the liquid composition has an HLB value of, for example, 7 to 16. In the liquid composition, the phosphoric acid ester typically functions to disperse the above-described light absorber. It has been thought that when a liquid composition mainly contains a low-polarity organic solvent such as toluene as its solvent, a phosphoric acid ester having a low HLB value is desirably used to appropriately disperse a light absorber. In the case of the liquid composition according to the present invention, the phosphoric acid ester used can have an HLB value in a wider range by virtue of the action of the alkoxysilane and the hydrolysate of an alkoxysilane. The HLB value is herein defined by the following equation (1) known as Kawakami's method.

HLB value=7+11.7 log(sum of formula weight of hydrophilic portion/sum of formula weight of lipophilic portion)  Equation (1)

The phosphoric acid ester contained in the liquid composition is not limited to any particular one. For example, the phosphoric acid ester includes at least one of a phosphoric acid diester represented by the following formula (c1) and a phosphoric acid monoester represented by the following formula (c2). In the formulae (c1) and (c2), $R_{21}$, $R_{22}$, and $R_5$ are each a monovalent functional group represented by —$(CH_2CH_2O)_nR_4$, wherein n is an integer of 1 to 25 and $R_4$ is an alkyl group having 6 to 25 carbon atoms. $R_{21}$, $R_{22}$, and $R_3$ may be the same or different functional groups.

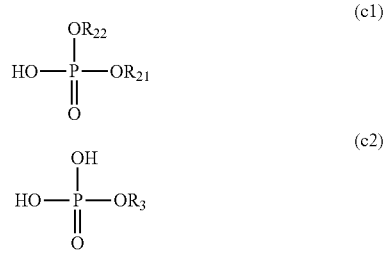

A transmittance spectrum of the liquid composition measured in a quartz cell having an optical path length of 1 mm satisfies, for example, the following requirements (i) and (ii):
  (i) the spectral transmittance increases with increasing wavelength in a wavelength range of 350 nm to 450 nm and an ultraviolet cut-off wavelength which lies in the wavelength range of 350 nm to 450 nm and at which the transmittance is 50% is in a wavelength range of 380 nm to 420 nm; and
  (ii) the spectral transmittance decreases with increasing wavelength in a wavelength range of 600 nm to 800 nm and an infrared cut-off wavelength which lies in the wavelength range of 600 nm to 800 nm and at which the transmittance is 50% is in a wavelength range of 600 nm to 690 nm.

When the transmittance spectrum of the liquid composition satisfies the above requirement (i), an optical filter produced using the liquid composition easily blocks, in an imaging apparatus, near-ultraviolet light unnecessary for imaging. Near-ultraviolet light has higher energy than that of visible light. Therefore, when the transmittance spectrum of the liquid composition satisfies the above requirement (i), members of the imaging apparatus are less likely to be deteriorated. The ultraviolet cut-off wavelength is desirably in the range of 385 nm to 415 nm in the transmittance spectrum of the liquid composition. When the transmittance spectrum of the liquid composition satisfies the above requirement (ii), an optical filter produced using the liquid composition easily blocks, in an imaging apparatus, near-infrared light unnecessary for imaging. The infrared cut-off wavelength is desirably 605 nm to 680 nm in the transmittance spectrum of the liquid composition. When the requirements (i) and (ii) are satisfied, a transmittance spectrum of an optical filter produced using the liquid composition is likely to be close to the visual sensitivity of humans.

The average transmittance in a wavelength range of 300 nm to 350 nm is, for example, 1% or less in the transmittance spectrum of the liquid composition. The average transmittance in a wavelength range of 300 nm to 370 nm is 2% or less in the transmittance spectrum of the liquid composition. In this case, an optical filter produced using the liquid composition more reliably blocks near-ultraviolet light unnecessary for imaging. The average transmittance is desirably 1% or less in the wavelength range of 300 nm to 370 nm in the transmittance spectrum of the liquid composition.

The average transmittance in a wavelength range of 400 nm to 600 nm is, for example, 70% or more in the transmittance spectrum of the liquid composition. The average transmittance in a wavelength range of 450 nm to 600 nm is, for example, 70% or more in the transmittance spectrum of the liquid composition. In this case, an optical filter produced using the liquid composition is likely to have a high level of transmittance in the visible region, and a desirable amount of visible light is likely to arrive at a solid-state imaging sensor of an imaging apparatus. The average transmittance in the wavelength range of 400 nm to 600 nm is desirably 75% or more and more desirably 78% or more in the transmittance spectrum of the liquid composition. The average transmittance in the wavelength range of 450 nm to 600 nm is desirably 75% or more, more desirably 80% or more, and even more desirably 82% or more in the transmittance spectrum of the liquid composition.

The transmittance at a wavelength of 800 nm is, for example, 20% or less in the transmittance spectrum of the liquid composition. In this case, an optical filter produced using the liquid composition more reliably blocks near-infrared light unnecessary for imaging. The transmittance at a wavelength of 800 nm is desirably 18% or less, more desirably 15% or less, even more desirably 10% or less, and particularly desirably 5% or less in the transmittance spectrum of the liquid composition.

The transmittance at a wavelength of 900 nm is, for example, 25% or less in the transmittance spectrum of the liquid composition. In this case, an optical filter produced using the liquid composition more reliably blocks near-infrared light unnecessary for imaging. The transmittance at a wavelength of 900 nm is desirably 23% or less, more desirably 20% or less, even more desirably 15% or less, and particularly desirably 10% or less in the transmittance spectrum of the liquid composition.

The transmittance at a wavelength of 1100 nm is, for example, 45% or less in the transmittance spectrum of the liquid composition. In this case, an optical filter produced using the liquid composition more reliably blocks near-infrared light unnecessary for imaging. It may be difficult to block near-infrared light around a wavelength of 1100 nm solely by means of absorption by the above-described light absorber, and therefore the use of a light-absorbing layer including the above-described light absorber and a reflecting film formed of a dielectric multilayer film in combination is considered. When the transmittance at a wavelength of 1100 nm is 45% or less in the transmittance spectrum of the liquid composition, the performance level required of the reflecting film is lower and the number of films in the dielectric multilayer film can be decreased. Additionally, in that case, the robustness against variation in film thickness between the dielectric multilayer films can be improved.

The transmittance at a wavelength of 1100 nm is desirably 40% or less and more desirably 30% or less in the transmittance spectrum of the liquid composition.

The transmittance at a wavelength of 1300 nm is, for example, 70% or less in the transmittance spectrum of the liquid composition.

The liquid composition is cured on a transparent substrate to form a light-absorbing film having a thickness of 40 μm to 250 μm. A laminate is produced in this manner. The laminate can function as an optical filter. The laminate satisfies, for example, the following requirements (I) and (II):

(I) the spectral transmittance of the laminate increases with increasing wavelength in the wavelength range of 350 nm to 450 nm and an ultraviolet cut-off wavelength which lies in the wavelength range of 350 nm to 450 nm and at which the transmittance of the laminate is 50% is in a wavelength range of 380 nm to 420 nm; and (II) the spectral transmittance of the laminate decreases with increasing wavelength in the wavelength range of 600 nm to 800 nm and an infrared cut-off wavelength which lies in the wavelength range of 600 nm to 800 nm and at which the transmittance of the laminate is 50% is in a wavelength range of 600 nm to 690 nm.

When the laminate satisfies the above requirements (I) and (II), an optical filter produced using the liquid composition easily blocks, in an imaging apparatus, near-ultraviolet and near-infrared light unnecessary for imaging. Moreover, when the laminate satisfies the above requirements (I) and (II), a transmittance spectrum of an optical filter produced using the liquid composition is likely to conform to the visual sensitivity of humans. The ultraviolet cut-off wavelength of the laminate is desirably in the range of 385 nm to 415 nm. The infrared cut-off wavelength of the laminate is desirably in the range of 605 nm to 680 nm. The transparent substrate has a transmittance of, for example, 70% or more in the wavelength range of 450 nm to 600 nm.

The laminate has an average transmittance of, for example, 1% or less in the wavelength range of 300 nm to 350 nm. In this case, an optical filter produced using the liquid composition more reliably blocks near-ultraviolet light unnecessary for imaging.

The laminate has an average transmittance of, for example, 3% or less in the wavelength range of 300 nm to 370 nm. In this case, an optical filter produced using the liquid composition more reliably blocks near-ultraviolet light unnecessary for imaging. The laminate desirably has an average transmittance of 2.5% or less in the wavelength range of 300 nm to 370 nm.

The laminate has an average transmittance of, for example, 70% or more in the wavelength range of 400 nm to 600 nm. In this case, an optical filter produced using the liquid composition is likely to have a high level of transmittance in the visible region, and a desirable amount of visible light is likely to arrive at a solid-state imaging sensor of an imaging apparatus. The laminate desirably has an average transmittance of 75% or more in the wavelength range of 400 nm to 600 nm.

The laminate has an average transmittance of, for example, 70% or more in the wavelength range of 450 nm to 600 nm. In this case, an optical filter produced using the liquid composition is likely to have a high level of transmittance in the visible region, and a desirable amount of visible light is likely to arrive at a solid-state imaging sensor of an imaging apparatus. The laminate desirably has an average transmittance of 75% or more and more desirably has an average transmittance of 80% or more in the wavelength range of 450 nm to 600 nm.

The laminate has a transmittance of, for example, 25% or less at a wavelength of 800 nm. In this case, an optical filter produced using the liquid composition more reliably blocks near-infrared light unnecessary for imaging. The laminate desirably has a transmittance of 20% or less at a wavelength of 800 nm.

The laminate has a transmittance of, for example, 25% or less at a wavelength of 900 nm. In this case, an optical filter produced using the liquid composition more reliably blocks near-infrared light unnecessary for imaging. The laminate desirably has a transmittance of 23% or less at a wavelength of 900 nm.

The laminate has a transmittance of, for example, 60% or less at a wavelength of 1100 nm. In this case, an optical filter produced using the liquid composition more reliably blocks near-infrared light unnecessary for imaging. It may be difficult to block near-infrared light around a wavelength of 1100 nm solely by means of absorption by the above-described light absorber, and therefore the use of a light-absorbing layer including the above-described light absorber and a reflecting film formed of a dielectric multilayer film in combination is considered. When the laminate has a transmittance of 60% or less at a wavelength of 1100 nm, the performance level required of the reflecting film is lower and the number of films in the dielectric multilayer film can be decreased. Additionally, in that case, the robustness against variation in film thickness between the dielectric multilayer films can be improved.

The laminate desirably has a transmittance of 57% or less and more desirably has a transmittance of 45% or less at a wavelength of 1100 nm.

The aryl group of the phosphonic acid forming the light absorber in the liquid composition is not particularly limited. The aryl group is, for example, a phenyl group, benzyl group, toluyl group, nitrophenyl group, hydroxyphenyl group, halogenated phenyl group in which at least one hydrogen atom of a phenyl group is substituted by a halogen atom, or halogenated benzyl group in which at least one hydrogen atom of a benzene ring of a benzyl group is substituted by a halogen atom.

The liquid composition may further contain, for example, a curable matrix resin serving as a matrix in a light-absorbing film obtained by curing the liquid composition. The matrix resin is, for example, but not particularly limited to, a resin that has a transmittance of, for example, 80% or more, desirably 85% or more, and more desirably 90% or more for light with a wavelength of 350 nm to 900 nm in the form of a 0.1-mm-thick resin layer.

The matrix resin is, for example, a (poly)olefin resin, polyimide resin, polyvinyl butyral resin, polycarbonate resin, polyamide resin, polysulfone resin, polyethersulfone resin, polyamideimide resin, (modified) acrylic resin, epoxy resin, or silicone resin. The matrix resin may contain an aryl group such as a phenyl group and is desirably a silicone resin containing an aryl group such as a phenyl group. If a light-absorbing film obtained by curing the liquid composition is excessively hard, the likelihood of cure shrinkage-induced cracking during a production process of an optical filter increases with increasing thickness of the light-absorbing film. When the matrix resin is a silicone resin containing an aryl group, the light-absorbing film is likely to have high crack resistance. Moreover, when a silicone resin containing an aryl group is used, the above-described light absorber is less likely to be aggregated. Further, when the matrix resin of the light-absorbing film is a silicone resin containing an aryl group, it is desirable for a phosphoric acid ester included in the light-absorbing film to have a flexible, linear organic functional group, such as an oxyalkyl group, just as does the phosphoric acid ester represented by the formula (c1) or formula (c2). This is because interaction derived from the combination of the above phosphonic acid, a silicone resin containing an aryl group, and the phosphoric acid ester having a linear organic functional group such as an oxyalkyl group makes aggregation of the light-absorber less likely and can impart good rigidity and good flexibility to the light-absorbing film. Specific examples of the silicone resin available as the matrix resin include KR-255, KR-300, KR-2621-1, KR-211, KR-311, KR-216, KR-212, KR-251, and KR-5230. All of these are silicone resins manufactured by Shin-Etsu Chemical Co., Ltd. It should be noted that some of the materials with these product codes include a solvent such as xylene in addition to the silicone resin (polysiloxane).

An optical filter can be produced using the liquid composition. For example, a light-absorbing film can be formed by applying the liquid composition, especially the liquid composition containing the curable matrix resin (resin-containing liquid composition) onto a given substrate and curing the resulting coating film. The optical filter may be composed only of the light-absorbing film. In this case, the light-absorbing film separated from the substrate can be used as the optical filter. Alternatively, the optical filter may include a transparent substrate and a light-absorbing film. For example, the transparent substrate has a transmittance of 70% or more in the wavelength range of 450 nm to 600 nm. The transparent substrate is, for example, made of resin or glass. When the transparent substrate is made of glass, the glass may be borosilicate glass such as D 263 T eco, soda-lime glass (blue plate glass), white sheet glass such as B 270, alkali-free glass, or infrared-absorbing glass such as copper-containing phosphate glass or copper-containing fluorophosphate glass. Examples of the infrared-absorbing glass include BG-60, BG-61, BG-62, BG-63, and BG-67 manufactured by SCHOTT AG, 500EXL manufactured by Nippon Electric Glass Co., Ltd., and CM5000, CM500, C5000, and C500S manufactured by HOYA CORPORATION. The transparent substrate may be a transparent crystalline substrate, such as magnesium oxide, sapphire, or quartz. When the transparent substrate is made of resin, the resin is not limited to a particular one. The resin is, for example, a (poly)olefin resin, polyimide resin, polyvinyl butyral resin, polycarbonate resin, polyamide resin, polysulfone resin, polyethersulfone resin, polyamideimide resin, (modified) acrylic resin, epoxy resin, or silicone resin.

The number of light-absorbing films in the optical filter may be 2 or more. In this case, for example, the transparent substrate is located between the light-absorbing films. The optical filter may further include at least one film selected from the group consisting of a reflecting film, an antireflection film, an infrared-absorbing film including an infrared absorber, and an ultraviolet-absorbing film including an ultraviolet absorber.

The reflecting film can be a film formed by vapor deposition of a metal such as aluminum or a dielectric multilayer film in which a layer formed of a high-refractive-index material and a layer formed of a low-refractive-index material are alternately laminated. A material, such as $TiO_2$, $ZrO_2$, $Ta_2O_5$, $Nb_2O_5$, ZnO, or $In_2O_3$, having a refractive index of 1.7 to 2.5 is used as the high-refractive-index material. A material, such as $SiO_2$, $Al_2O_3$, or $MgF_2$, having a refractive index of 1.2 to 1.6 is used as the low-refractive-index material.

The anti-reflection film is a film formed as an interface between the optical filter and air to reduce reflection of visible light. The anti-reflection film is, for example, a film formed of a dielectric made of, for example, a resin, an oxide, or a fluoride. The anti-reflection film may be a multilayer film formed by laminating two or more types of dielectrics having different refractive indices. The anti-reflection film may be, particularly, a dielectric multilayer film made of a low-refractive-index material such as $SiO_2$ and a high-refractive-index material such as $TiO_2$ or $Ta_2O_5$. In this case, Fresnel reflection at the interface between the optical filter and air is reduced and the amount of visible light passing through the optical filter can be increased.

The infrared absorber included in the infrared-absorbing film is, for example, but not particularly limited to, an organic infrared absorber, such as a cyanine-based, phthalocyanine-based, squarylium-based, diimmonium-based, or azo-based infrared absorber or an infrared absorber composed of a metal complex.

The ultraviolet absorber included in the ultraviolet-absorbing film is, for example, but not particularly limited to, an ultraviolet absorber, such as a benzophenone-based, triazine-based, indole-based, merocyanine-based, or oxazole-based ultraviolet absorber.

An exemplary method for preparing the liquid composition will now be described. A copper salt such as copper acetate monohydrate is added to a given solvent such as tetrahydrofuran (THF) (relative permittivity at 20° C.: 7.8; boiling point: about 66° C.), and the mixture is stirred to give a copper salt solution. To this copper salt solution is then added a phosphoric acid ester compound such as a phosphoric acid diester represented by the formula (c1) or a phosphoric acid monoester represented by the formula (c2), and the mixture is stirred to obtain a solution A. A solution B is prepared by adding the above-described phosphonic acid to a given solvent such as THF, stirring the mixture, further adding the alkoxysilane or the hydrolysate of an alkoxysilane, and stirring the mixture. When the solution B is to contain a plurality of phosphonic acids, the solution B may be prepared by mixing a plurality of liquids prepared beforehand by adding each of the phosphonic acids to a given solvent such as THF.

Next, the solution B is added to the solution A while the solution A is stirred, and the mixture is further stirred for a given period of time. To the resulting solution is then added an organic solvent having a relative permittivity of more than 7 at 20° C. and a relatively high boiling point, followed by stirring to obtain a solution C. Subsequently, the solution C is subjected to solvent removal (solvent replacement) under heating for a given period of time to obtain a solution D. This process removes the solvent such as THF and a component such as acetic acid (boiling point: about 118° C.) generated by disassociation of the copper salt and yields a light absorber formed by the phosphonic acid and copper ion. The temperature at which the solution C is heated is chosen based on the boiling point of the to-be-removed component disassociated from the copper salt. During the solvent removal, the organic solvent having a relative permittivity of more than 7 at 20° C., which was used to obtain the solution C, can also be evaporated. A certain amount of this organic solvent desirably remains in the liquid composition. This is preferably taken into account in determining the amount of the organic solvent to be added and the time period of the solvent removal.

The solution D may be used as it is as the liquid composition. Alternatively, the solution D further containing the matrix resin such as a silicone resin may be used as the liquid composition.

EXAMPLES

The present invention will be described in more detail by examples. The present invention is not limited to the examples given below. First, methods for evaluation of liquid compositions, resin-containing liquid compositions, and optical filters will be described.

<Measurement of Samples of Liquid Composition and Resin-Containing Composition>

Liquid compositions and liquid compositions containing a curable matrix resin (resin-containing liquid compositions) were each put in a quartz cell (manufactured by JASCO Corporation; product code: J/1/Q/1; optical path length: 1 mm; optical path width: 10 mm; outer dimensions: 3.5 mm in length, 12.5 mm in width, and 45 mm in height; capacity: 0.400 ml) to make a sample for transmittance spectrum measurement. Transmittance spectra of the quartz cells containing the liquid compositions and the resin-containing liquid compositions were measured at an incident angle of 0° using an ultraviolet-visible-near-infrared spectrophotometer (manufactured by JASCO Corporation; product code: V770). The quartz cells have a transmittance of 90% or more in a wavelength range of 300 nm to 2200 nm in a blank state (in an empty state).

<Measurement of Transmittance Spectrum of Optical Filter>

Transmittance spectra of optical filters were measured at an incident angle of 0° using an ultraviolet-visible-near-infrared spectrophotometer (manufactured by JASCO Corporation; product code: V670).

<Measurement of Thickness of Light-Absorbing Film>

The thickness of a light-absorbing film in each optical filter was measured using a laser displacement meter (manufactured by Keyence Corporation; product name: LK-H008). The results are shown in Table 5.

Examples 1 and 2

(Preparation of Liquid Composition 1)

2.93 g of copper acetate monohydrate and 117.07 g of tetrahydrofuran (THF) were mixed, and the mixture was stirred for 1 hour to obtain a copper acetate solution. A residue not having been dissolved by the stirring was removed using a filter having a pore size of 5 μm. Then, 100 g of the copper acetate solution was weighed out, 3.000 g of PLYSURF A219B (manufactured by DKS Co., Ltd.; HLB value: 16) which is a phosphoric acid ester compound was added thereto, and the mixture was stirred for 30 minutes to obtain a solution A. Further, 20 g of THF was added to 0.357 g of phenylphosphonic acid, and the mixture was stirred for 10 minutes to obtain a solution B-1. Separately, 20 g of THF was added to 2.143 g of 4-bromophenylphosphonic acid, and the mixture was stirred for 10 minutes to obtain a solution B-2. Next, the solutions B-1 and B-2 were mixed, and the mixture was stirred for 1 minute. 4.332 g of methyltriethoxysilane (MTES) (manufactured by Shin-Etsu Chemical Co., Ltd.) and 1.420 g of tetraethoxysilane (TEOS) (manufactured by KISHIDA CHEMICAL Co., Ltd.; special grade) were added thereto, and the mixture was further stirred for 1 minute to obtain a solution B. The solution B was added to the solution A while the solution A was stirred, and the mixture was stirred at room temperature for 1 minute. To the resulting solution was then added 40 g of cyclopentanone (CP), and the mixture was further stirred at room temperature for 1 minute to obtain a solution C. The solution C was placed in a flask and subjected to solvent replacement using a rotary evaporator (manufactured by Tokyo Rikakikai Co., Ltd.; product code: N-1110SF) under heating by means of an oil bath (manufactured by Tokyo Rikakikai Co., Ltd.; product code: OSB-2100) set to 105° C. As a result, a liquid composition 1 containing a light absorber dispersed in cyclopentanone and formed by a phenyl-based phosphonic acid and copper ion was obtained. The amounts of the raw materials added and the mass ratios of the raw materials and the components in the liquid composition 1 are shown in Table 1. A transmittance spectrum of the liquid composition 1 is shown in FIG. 1, and property values found from the transmittance spectrum are shown in Table 2. The liquid composition 1 has been confirmed to have good optical properties demonstrated by absorption of both near-ultraviolet and near-infrared light.

(Preparation of Resin-Containing Liquid Composition)

Figure 2A:
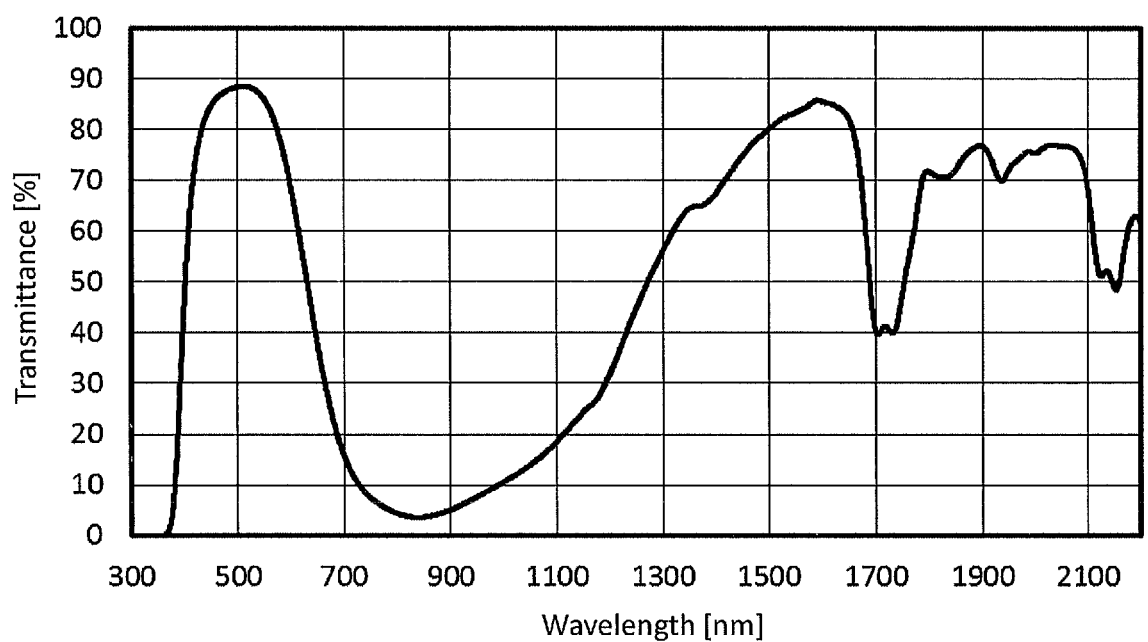
FIG. 2A shows a transmittance spectrum of a resin-containing liquid composition 1-1.
Figure 2B:
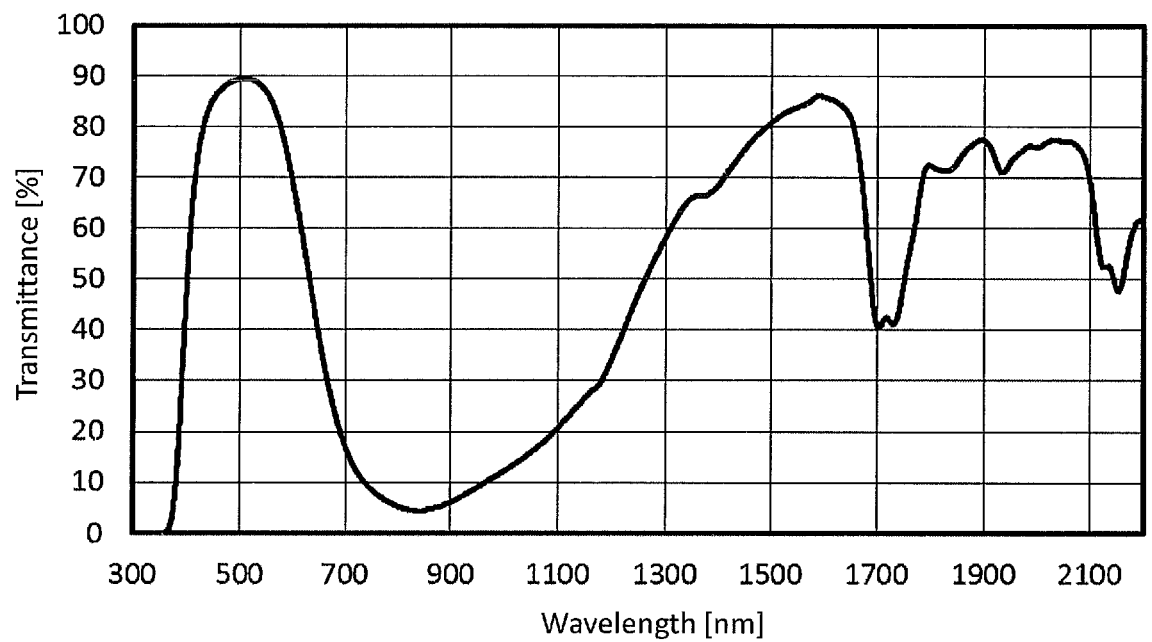
FIG. 2B shows a transmittance spectrum of a resin-containing liquid composition 1-2.

1.76 g of silicone resin (manufactured by Shin-Etsu Chemical Co., Ltd.; product name: KR-300) as a matrix resin was added to 22.59 g of the liquid composition 1, followed by stirring for 30 minutes to prepare a resin-containing liquid composition 1-1. Separately, 3.52 g of a silicone resin (manufactured by Shin-Etsu Chemical Co., Ltd.; product name: KR-300) was added to 22.59 g of the liquid composition 1, followed by stirring for 30 minutes to prepare a resin-containing liquid composition 1-2. The percentage contents of the phosphoric acid ester, alkoxysilane-derived solids, and a solvent having a relative permittivity of 7 or less in the resin-containing liquid compositions 1-1 and 1-2 are shown in Table 3 in terms of mass. Transmittance spectra of the resin-containing liquid compositions 1-1 and 1-2 are respectively shown in FIGS. 2A and 2B. Property values found from these transmittance spectra are shown in Table 4. These results confirm that the resin-containing liquid compositions 1-1 and 1-2 have good optical properties demonstrated by absorption of both near-ultraviolet and near-infrared light. According to a material safety data sheet (MSDS) provided by Shin-Etsu Chemical Co., Ltd., KR-300 including a silicone resin used as a curable resin includes 20 to 25% of xylene, 20 to 25% of ethylbenzene (relative permittivity at 20° C.: 2.45), and 0.1 to 0.5% of 2-propanol (relative permittivity at 20° C.: 19.9) in terms of mass. This indicates that KR-300 includes up to 50% of the solvent having a relative permittivity of 7 or less in terms of mass. Therefore, the percentage content of the solvent having a relative permittivity of 7 or less in each of the resin-containing liquid compositions (solvent having a relative permittivity of 7 or less/resin-containing liquid composition) in terms of mass in Table 3 was calculated assuming that KR-300 included 50% of the solvent having a relative permittivity of 7 or less in terms of mass.

(Production of Optical Filter)

Figure 3A:
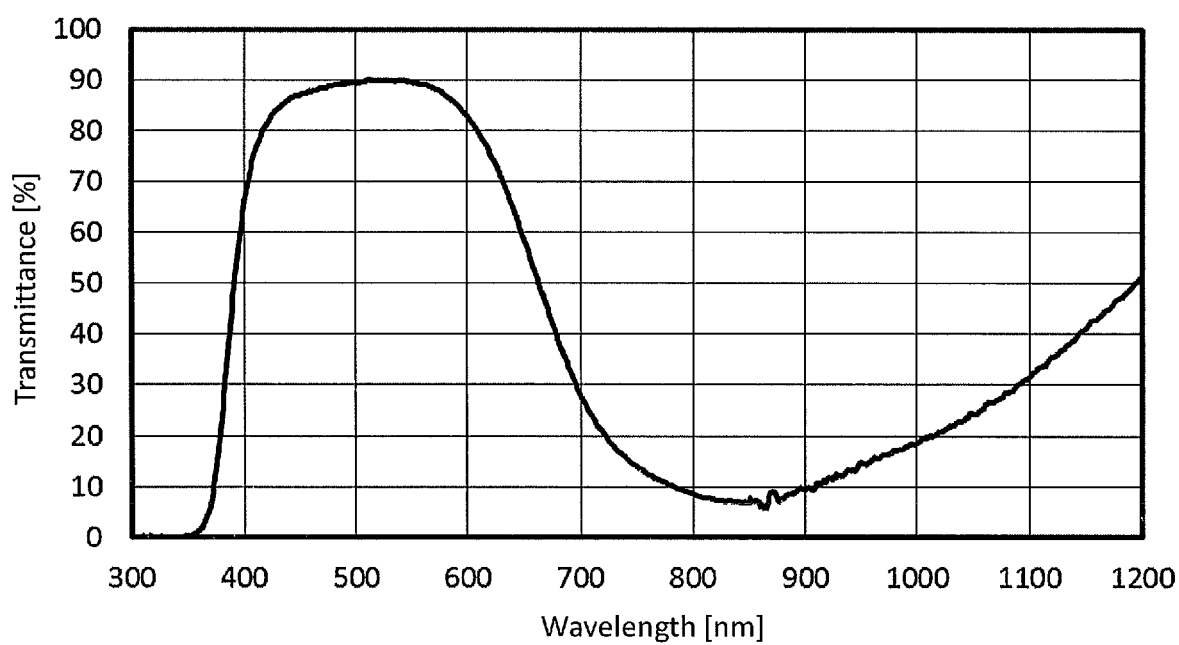
FIG. 3A shows a transmittance spectrum of an optical filter according to Example 1.
Figure 3B:
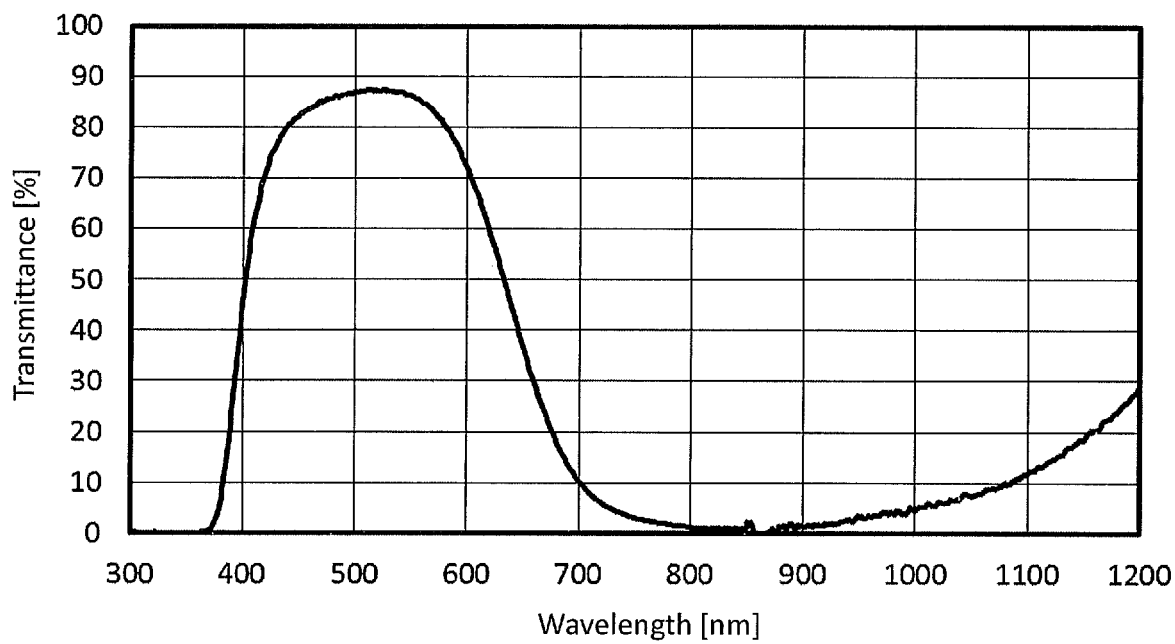
FIG. 3B shows a transmittance spectrum of an optical filter according to Example 2.
Figure 32:
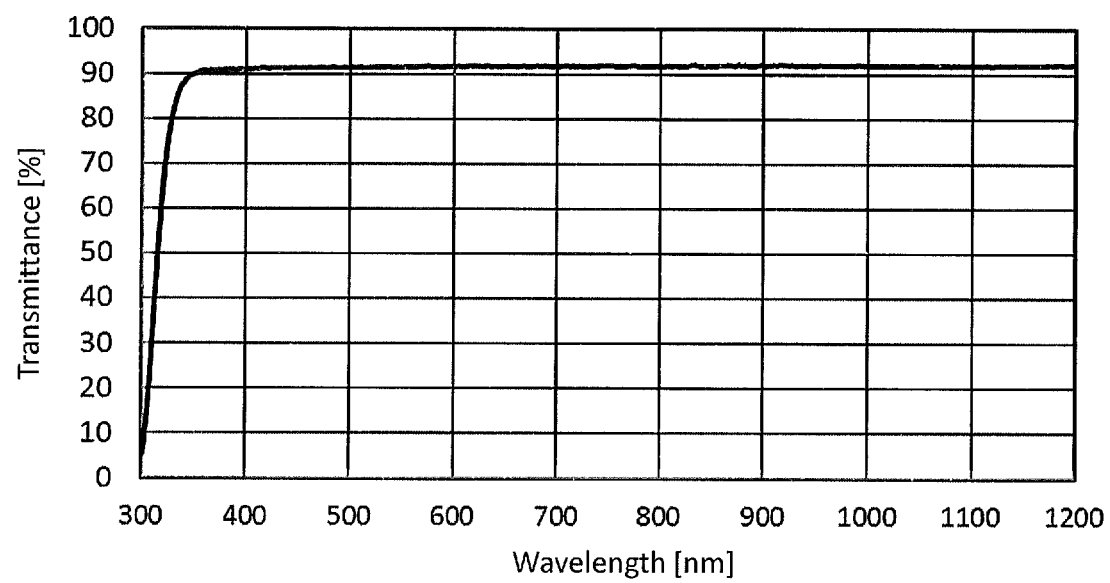
FIG. 32 shows a transmittance spectrum of a transparent glass substrate.

The resin-containing liquid composition 1-1 was applied with a dispenser to a 40 mm×40 mm region of a transparent glass substrate (manufactured by SCHOTT AG, product name: D 263 T eco) made of borosilicate glass and having dimensions of 76 mm×76 mm×0.21 mm. Afterward, the coating film was heated and cured at 45°C for 1 hour and at 85° ° C. for 2 hours to form a light-absorbing film. An optical filter according to Example 1 was obtained in this manner. Additionally, an optical filter according to Example 2 was obtained in the same manner as in Example 1, except that the resin-containing liquid composition 1-2 was used. Transmittance spectra of the optical filters according to Examples 1 and 2 are respectively shown in FIGS. 3A and 3B. Property values found from these transmittance spectra are shown in Table 5. These results confirm that the optical filters according to Examples 1 and 2 have good optical properties demonstrated by absorption of both near-ultraviolet and near-infrared light. A transmittance spectrum of the transparent glass substrate of the optical filter according to Example 1 is shown in Table 6 and FIG. 32.

Examples 3 to 15

(Preparation of Liquid Compositions 2 to 8)

Figure 4:
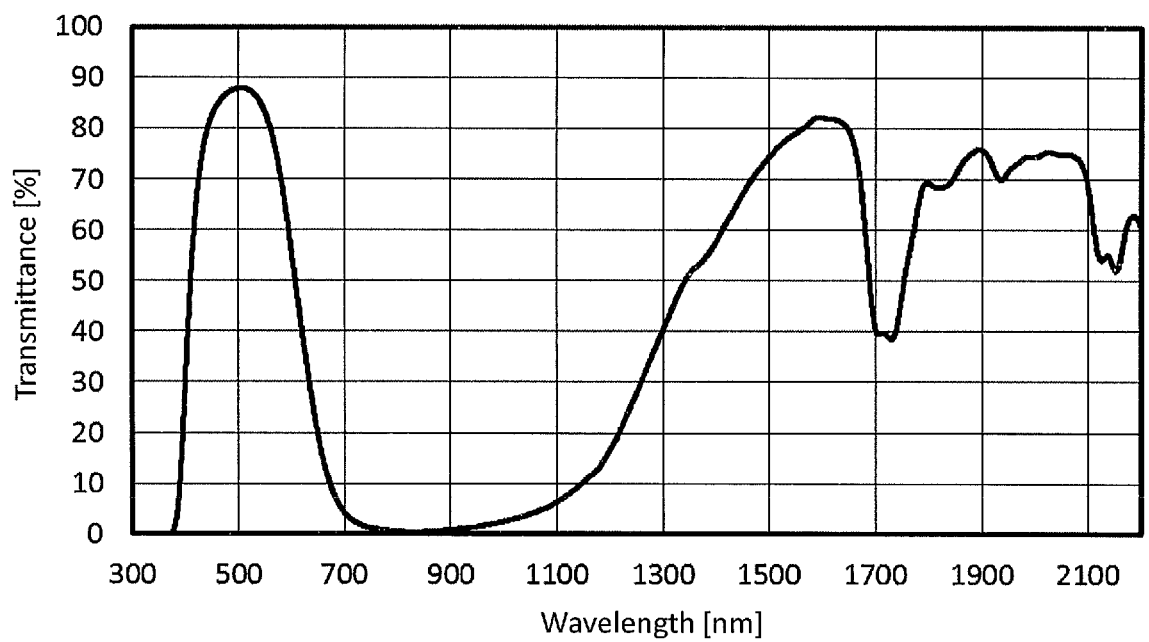
FIG. 4 shows a transmittance spectrum of a liquid composition 6.
Figure 5:
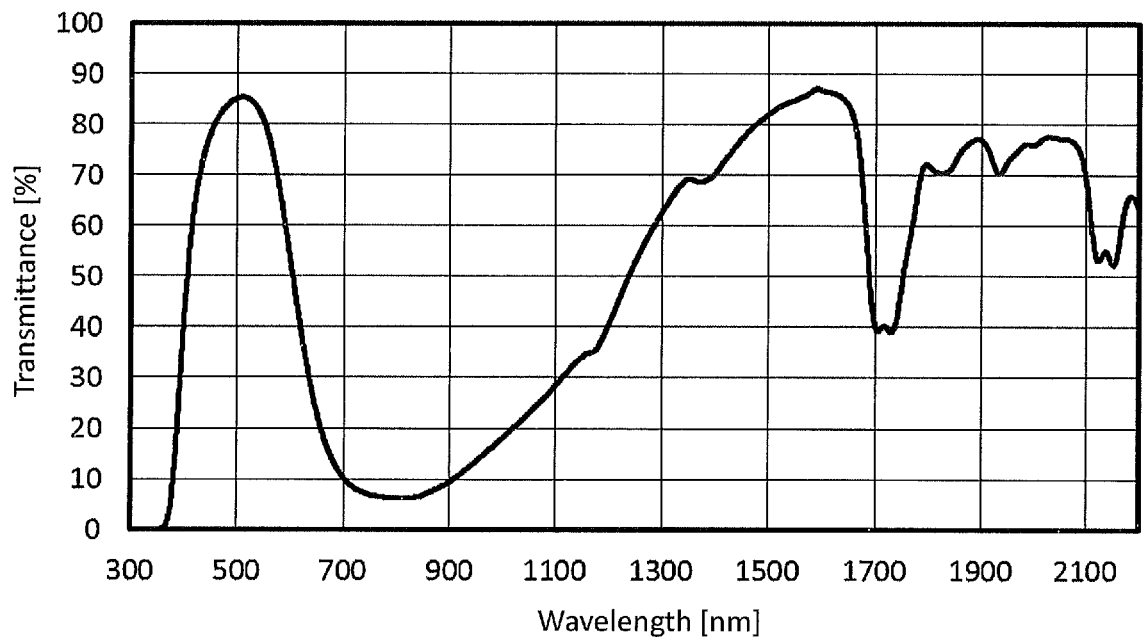
FIG. 5 shows a transmittance spectrum of a liquid composition 8.

Liquid compositions 2 to 8 were prepared in the same manner as for the liquid composition 1, except that the amounts of the raw materials added were adjusted as shown in Table 1. Transmittance spectra of the liquid compositions 6 and 8 are respectively shown in FIGS. 4 and 5. Property values found from transmittance spectra of the liquid compositions 2 to 8 are shown in Table 2.

(Preparation of Resin-Containing Liquid Composition)

Figure 6A:
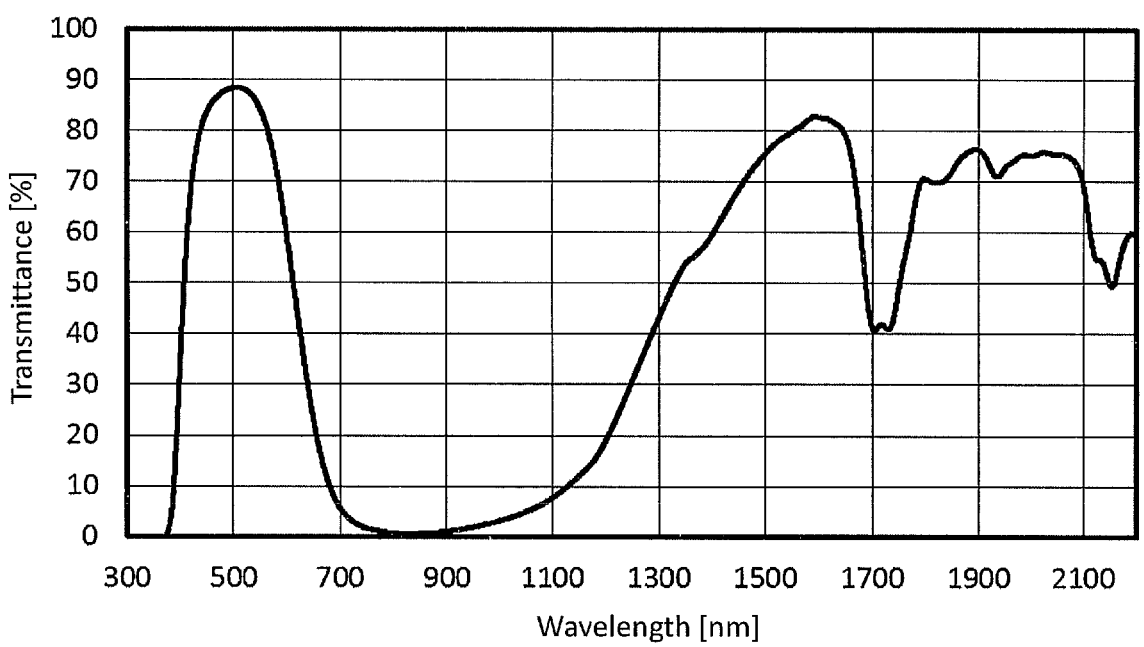
FIG. 6A shows a transmittance spectrum of a resin-containing liquid composition 6-1.
Figure 6B:
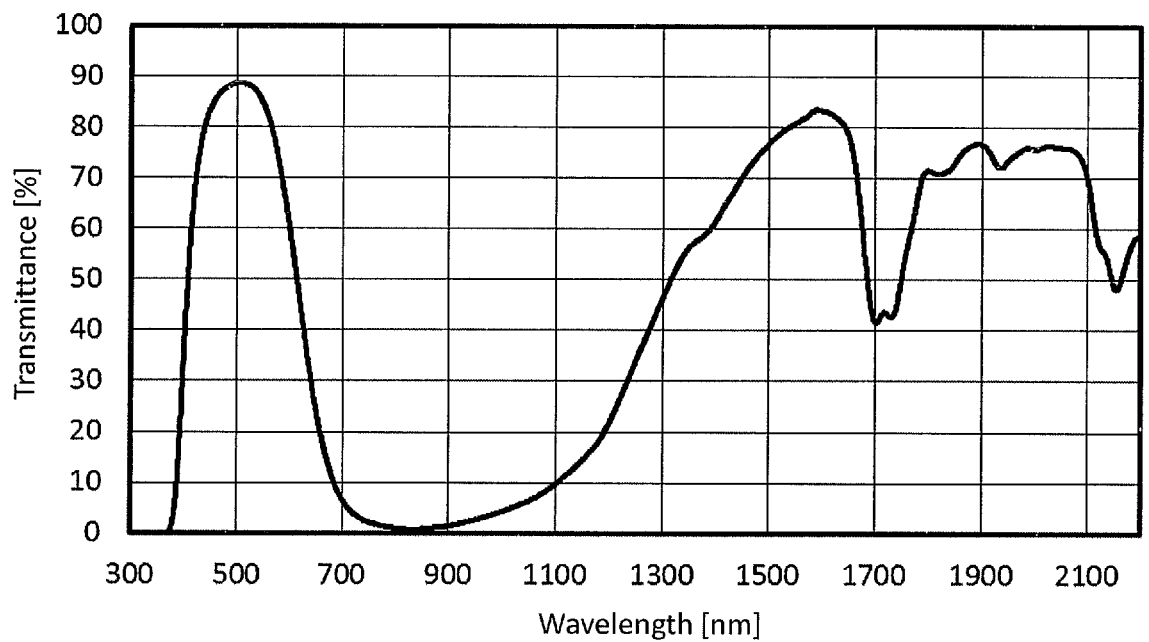
FIG. 6B shows a transmittance spectrum of a resin-containing liquid composition 6-2.
Figure 7:
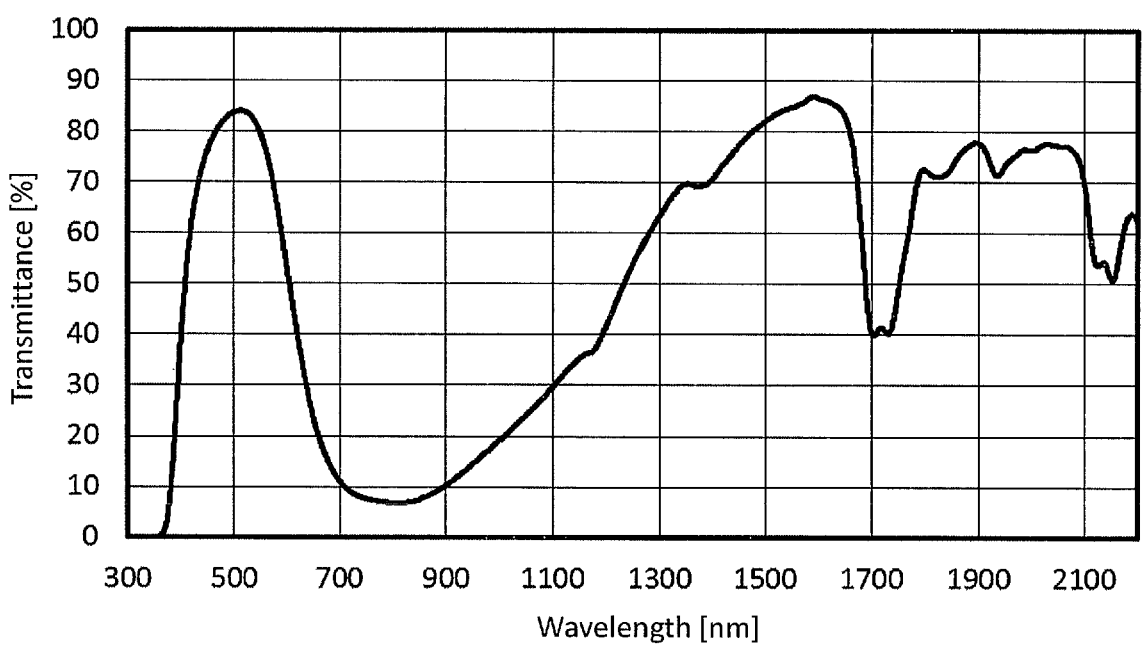
FIG. 7 shows a transmittance spectrum of a resin-containing liquid composition 8-1.

Resin-containing liquid compositions 2-1, 2-2, 3-1, 3-2, 4-1, 4-2, 5-1, 5-2, 6-1, 6-2, 7-1, 7-2, and 8-1 were produced in the same manner as for the resin-containing liquid composition 1-1, except that, as shown in Table 3, the liquid compositions 2 to 8 were used instead of the liquid composition 1 and the amounts of the matrix resin added and the liquid composition added were adjusted. It should be noted that "solvent having a relative permittivity of 7 or less/resin-containing liquid composition" of every resin-containing liquid composition in Table 3 was calculated, in the same manner as for the resin-containing liquid compositions 1-1 and 1-2, assuming that KR-300 included 50% of the solvent having a relative permittivity of 7 or less in terms of mass. Transmittance spectra of the resin-containing liquid compositions 6-1 and 6-2 are respectively shown in FIGS. 6A and 6B. A transmittance spectrum of the resin-containing liquid composition 8-1 is shown in FIG. 7. Property values found from transmittance spectra of the resin-containing liquid compositions 2-1, 2-2, 3-1, 3-2, 4-1, 4-2, 5-1, 5-2, 6-1, 6-2, 7-1, 7-2, and 8-1 are shown in Table 4.

(Production of Optical Filter)

Figure 8:
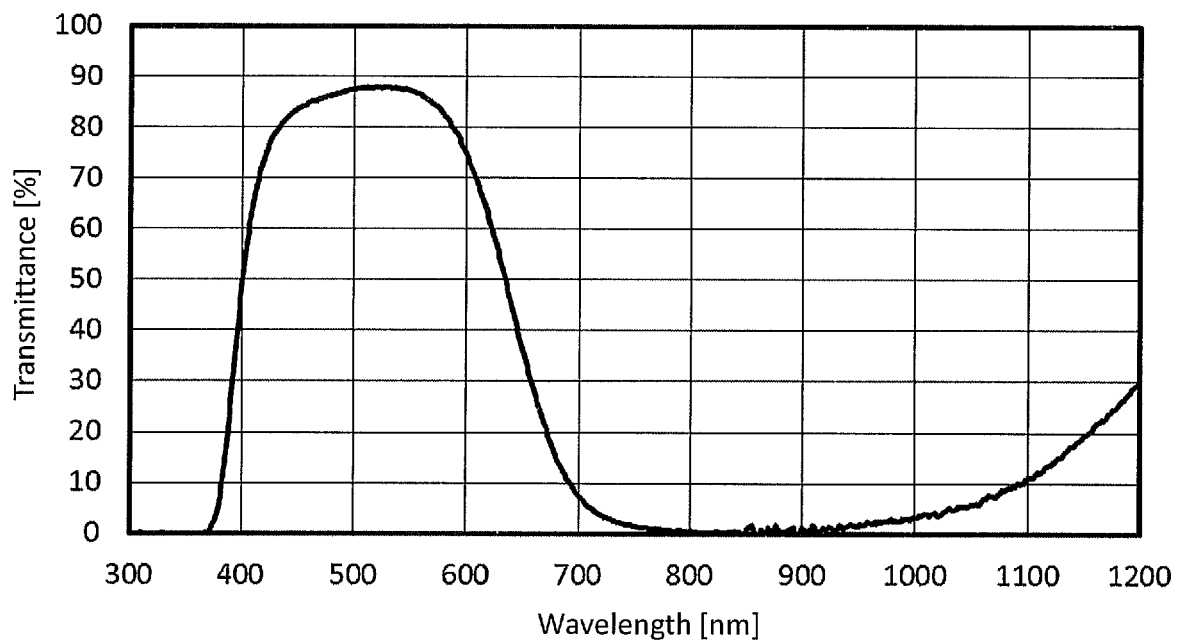
FIG. 8 shows a transmittance spectrum of an optical filter according to Example 11.
Figure 9:
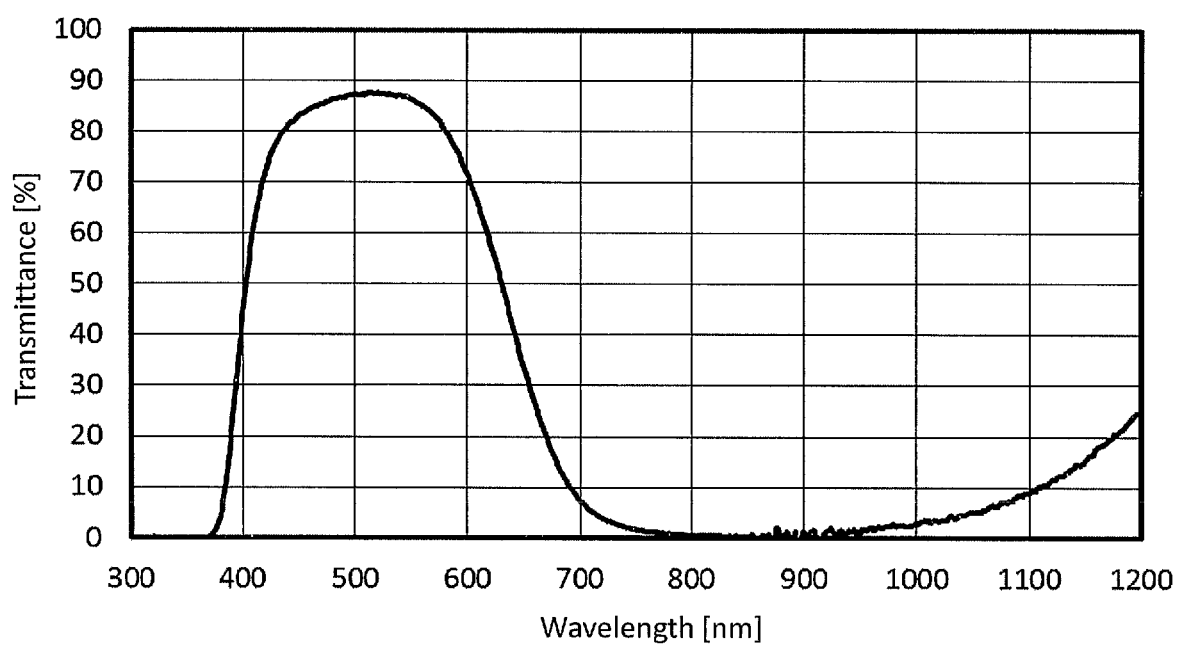
FIG. 9 shows a transmittance spectrum of an optical filter according to Example 12.
Figure 10:
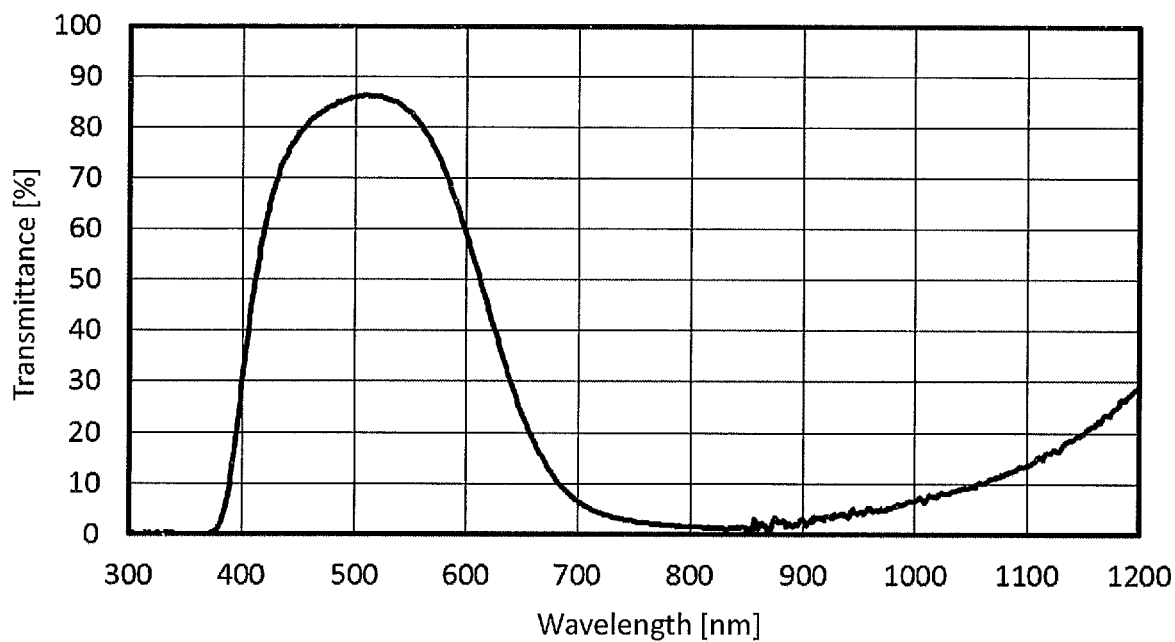
FIG. 10 shows a transmittance spectrum of an optical filter according to Example 15.

Optical filters according to Examples 3 to 15 were produced in the same manner as for the optical filter according to Example 1, except that the resin-containing liquid compositions 2-1, 2-2, 3-1, 3-2, 4-1, 4-2, 5-1, 5-2, 6-1, 6-2, 7-1, 7-2, and 8-1 were used instead of the resin-containing liquid composition 1-1. Transmittance spectra of the optical filters according to Examples 11, 12, and 15 are respectively shown in FIGS. 8, 9, and 10. Property values found from transmittance spectra of the optical filters according to Examples 3 to 15 are shown in Table 5.

The results for Examples 3 to 15 indicate that even when the mass ratios of the raw materials differ between liquid compositions, the resulting liquid compositions, resin-containing liquid compositions, and optical filters have good transmittance properties.

Example 16

(Preparation of Liquid Composition 9)

Figure 11:
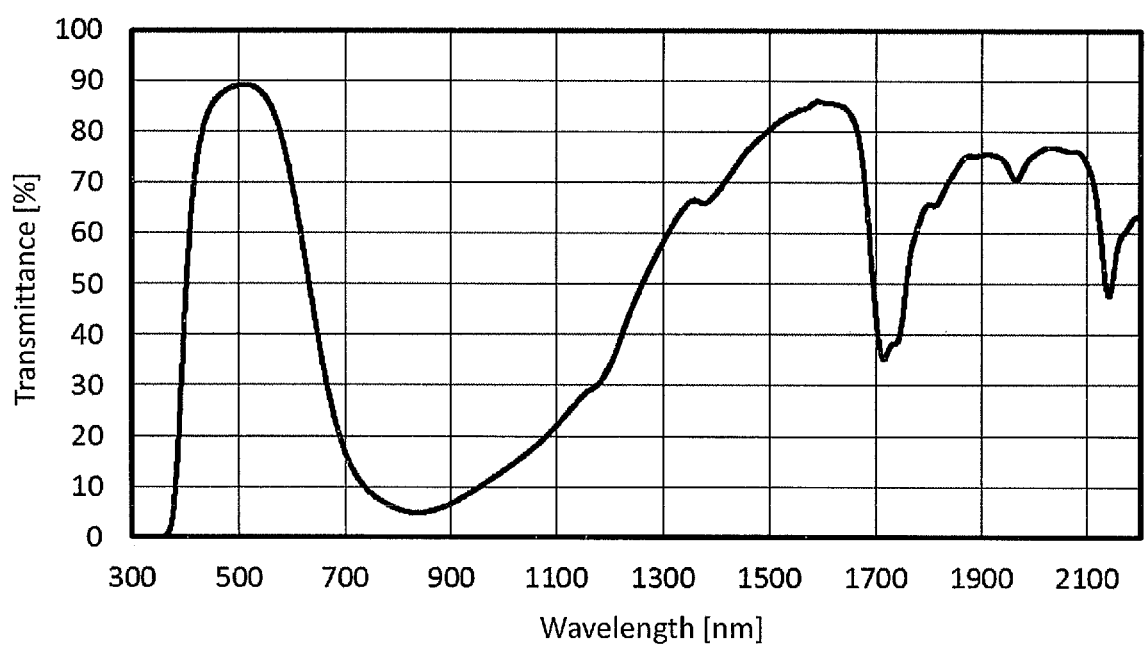
FIG. 11 shows a transmittance spectrum of a liquid composition 9.

A liquid composition 9 was prepared in the same manner as for the liquid composition 1, except that cyclohexanone (CH) was used instead of cyclopentanone (CP) and the amounts of the raw materials were adjusted as shown in Table 1. A transmittance spectrum of the liquid composition 9 is shown in FIG. 11. Property values found from the transmittance spectrum are shown in Table 2.

(Preparation of Resin-Containing Liquid Composition)

Figure 12:
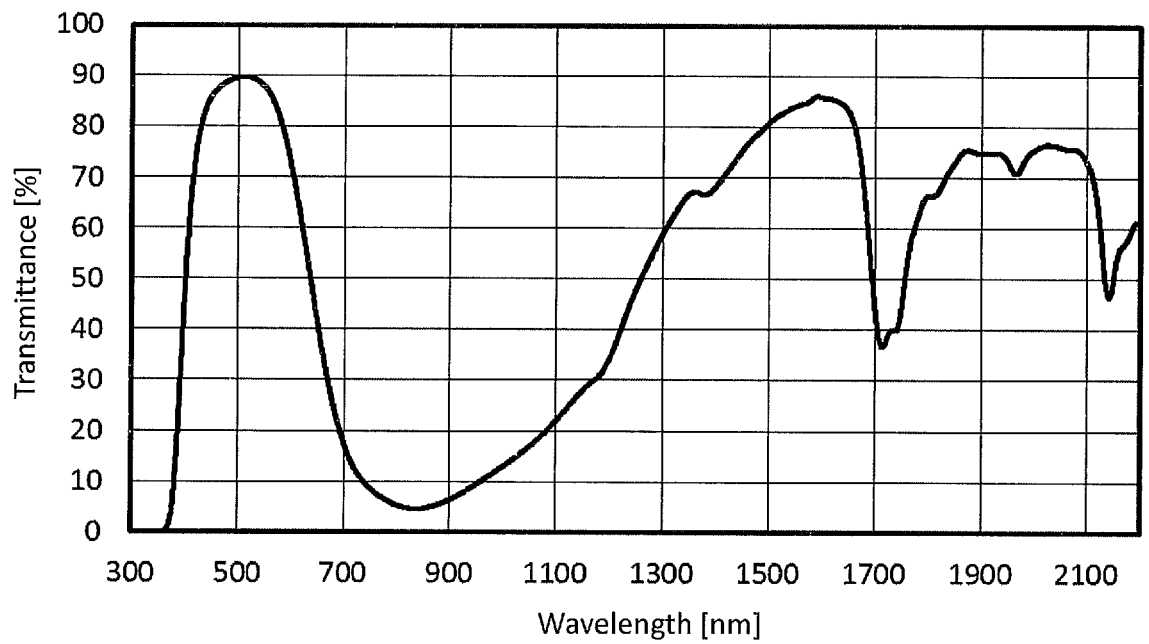
FIG. 12 shows a transmittance spectrum of a resin containing liquid composition 9-1.

A resin-containing liquid composition 9-1 was prepared in the same manner as for the resin-containing liquid composition 1-1, except that, as shown in Table 3, the liquid composition 9 was used instead of the liquid composition 1 and the amounts of the matrix resin added and the liquid composition added were adjusted. A transmittance spectrum of the resin-containing liquid composition 9-1 is shown in FIG. 12. Property values found from the transmittance spectrum are shown in Table 4.

(Production of Optical Filter)

Figure 13:
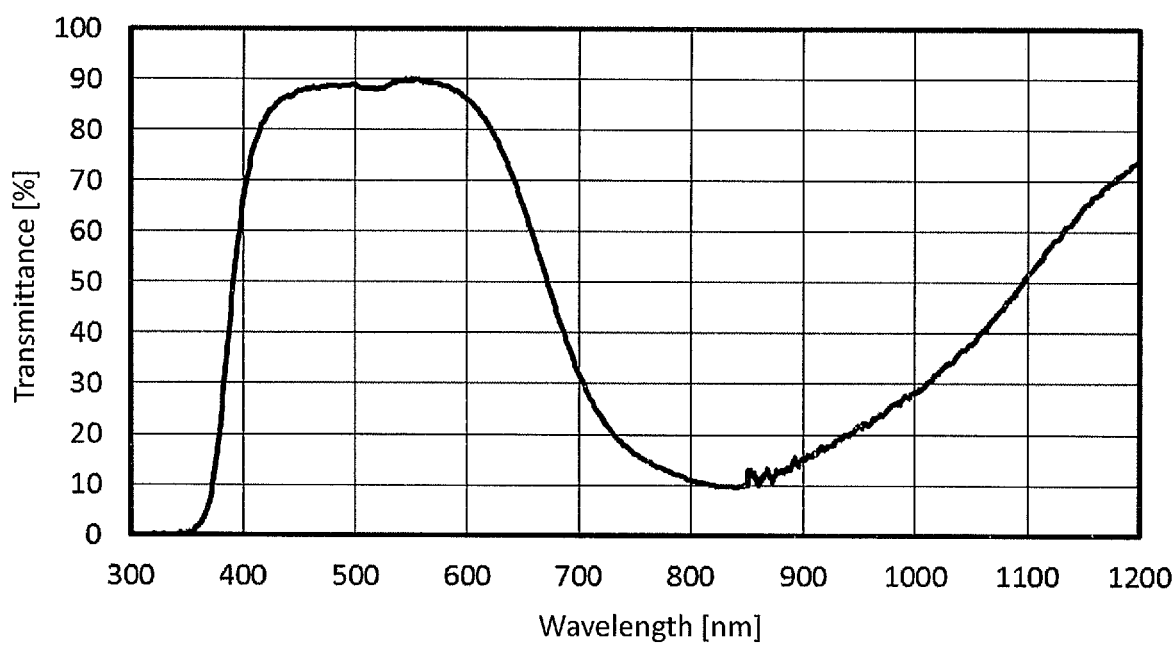
FIG. 13 shows a transmittance spectrum of an optical filter according to Example 16.

An optical filter according to Example 16 was produced in the same manner as for the optical filter according to Example 1, except that the resin-containing liquid composition 9-1 was used instead of the resin-containing liquid composition 1-1. A transmittance spectrum of the optical filter according to Example 16 is shown in FIG. 13. Property values found from the transmittance spectrum are shown in Table 5.

Example 17

(Preparation of Liquid Composition 10)

Figure 14:
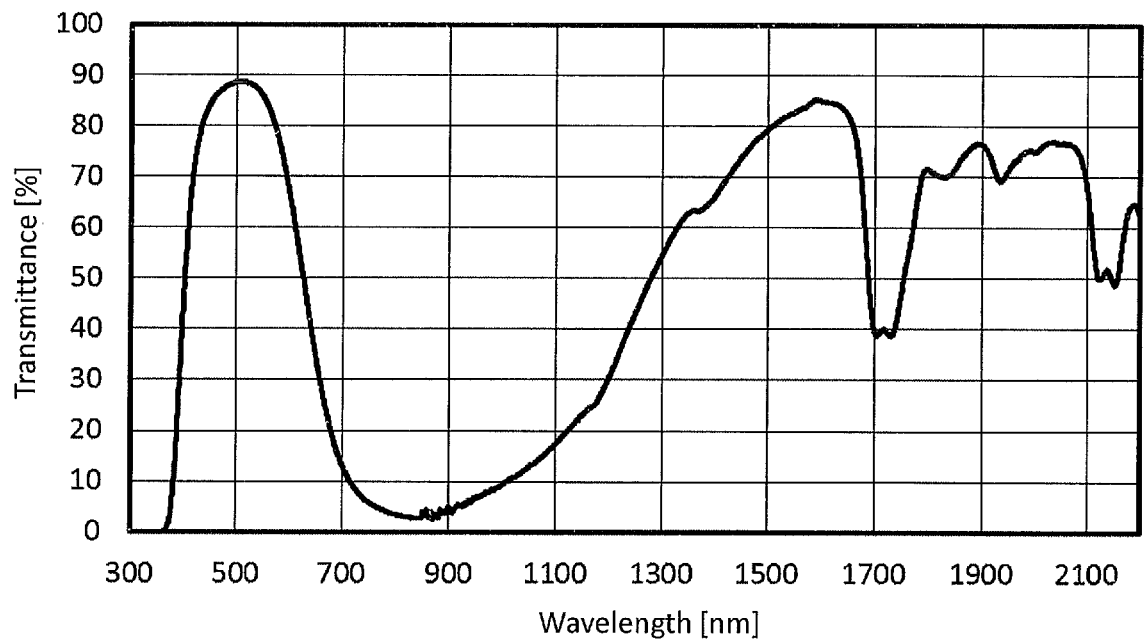
FIG. 14 shows a transmittance spectrum of a liquid composition 10.

A liquid composition 10 was prepared in the same manner as for the liquid composition 1, except that PLYSURF A215C (manufactured by DKS Co., Ltd.; HLB value: 11) was used as the phosphoric acid ester instead of PLYSURF A219B and the amounts of the raw materials added were adjusted as shown in Table 1. A transmittance spectrum of the liquid composition 10 is shown in FIG. 14. Property values found from the transmittance spectrum are shown in Table 2.

(Preparation of Resin-Containing Liquid Composition)

Figure 15:
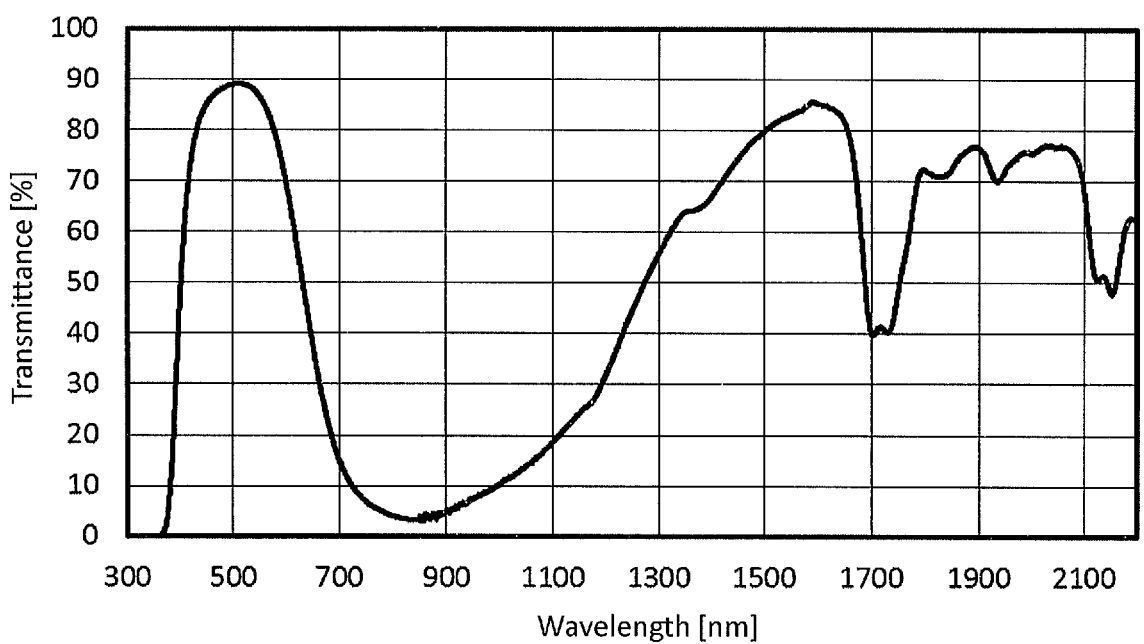
FIG. 15 shows a transmittance spectrum of a resin-containing liquid composition 10-1.

A resin-containing liquid composition 10-1 was prepared in the same manner as for the resin-containing liquid composition 1-1, except that, as shown in Table 3, the liquid composition 10 was used instead of the liquid composition 1 and the amounts of the matrix resin added and the liquid composition added were adjusted. A transmittance spectrum of the resin-containing liquid composition 10-1 is shown in FIG. 15. Property values found from the transmittance spectrum are shown in Table 4.

(Production of Optical Filter)

Figure 16:
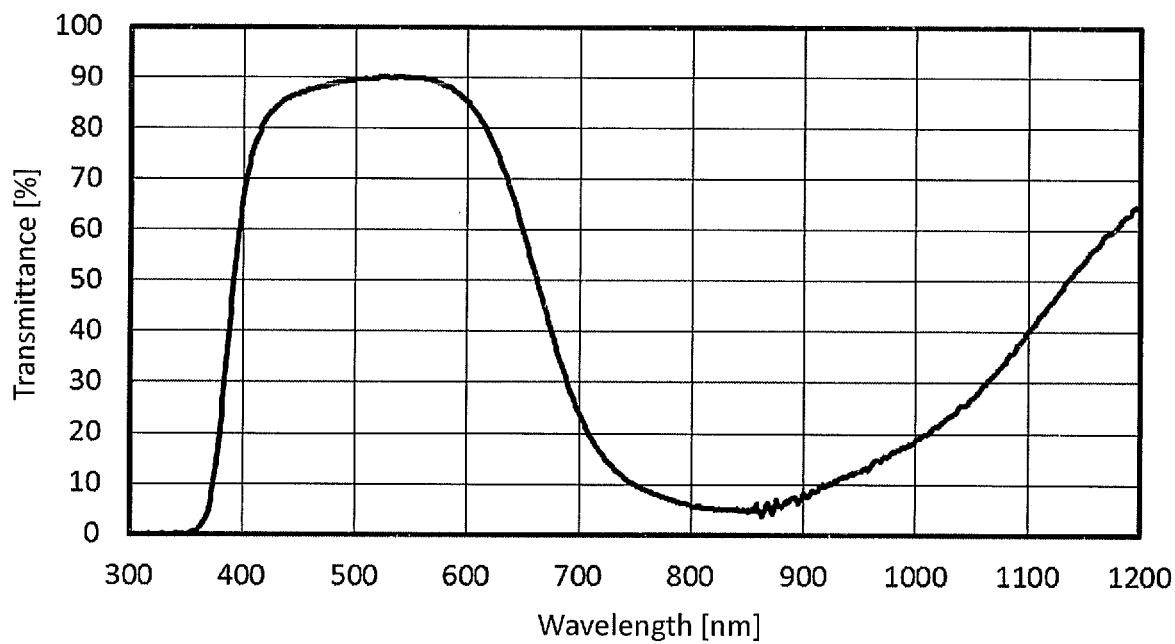
FIG. 16 shows a transmittance spectrum of an optical filter according to Example 17.

An optical filter according to Example 17 was produced in the same manner as for the optical filter according to Example 1, except that the resin-containing liquid composition 10-1 was used instead of the resin-containing liquid composition 1-1. A transmittance spectrum of the optical filter according to Example 17 is shown in FIG. 16. Property values found from the transmittance spectrum are shown in Table 5.

Example 18

(Preparation of Resin-Containing Liquid Composition)

Figure 17:
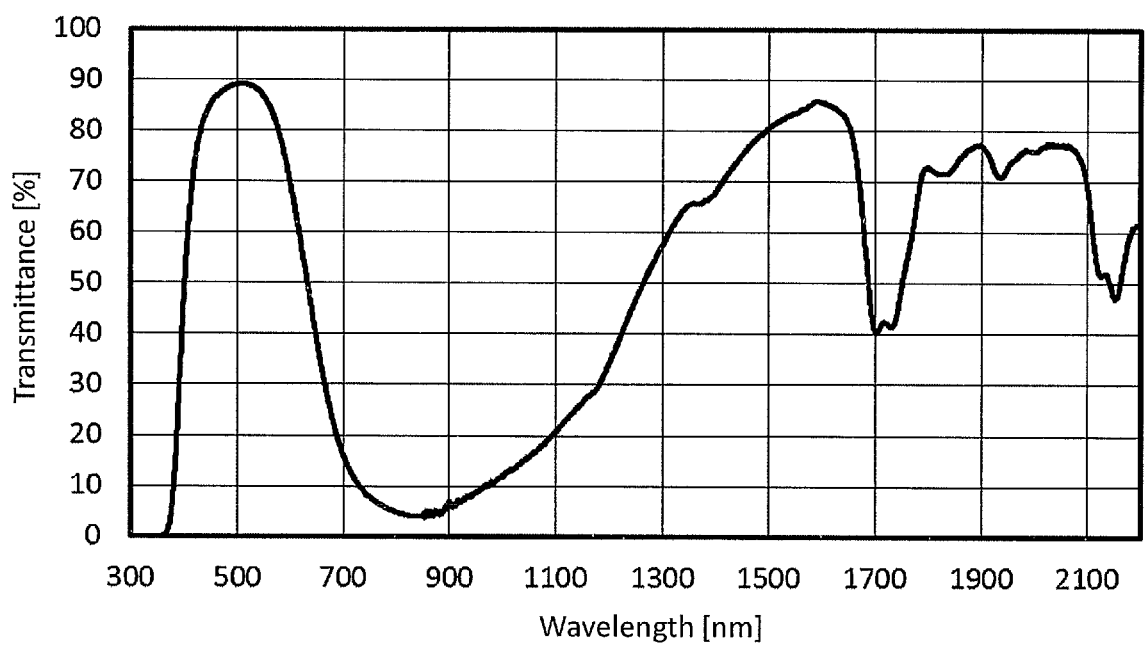
FIG. 17 shows a transmittance spectrum of a resin-containing liquid composition 10-2.

A resin-containing liquid composition 10-2 was prepared in the same manner as for the resin-containing liquid composition 1-1, except that, as shown in Table 3, the liquid composition 10 was used instead of the liquid composition 1 and the amounts of the matrix resin added and the liquid composition added were adjusted. A transmittance spectrum of the resin-containing liquid composition 10-2 is shown in FIG. 17. Property values found from the transmittance spectrum are shown in Table 4.

(Production of Optical Filter)

Figure 18:
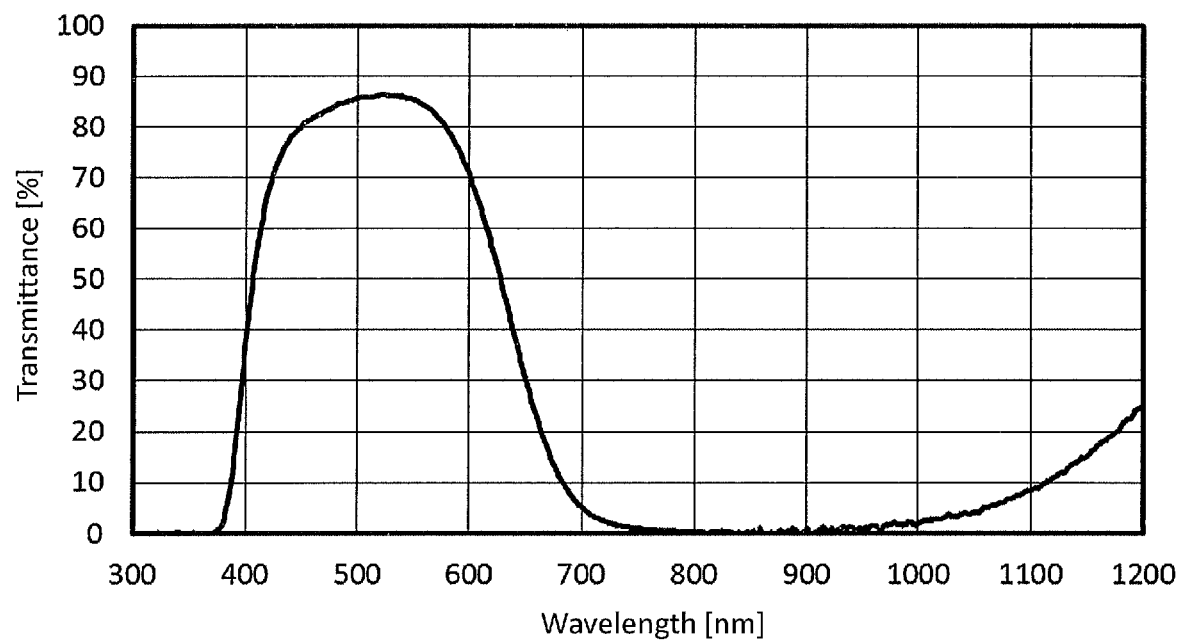
FIG. 18 shows a transmittance spectrum of an optical filter according to Example 18.

An optical filter according to Example 18 was produced in the same manner as for the optical filter according to Example 1, except that the resin-containing liquid composition 10-2 was used instead of the resin-containing liquid composition 1-1. A transmittance spectrum of the optical filter according to Example 18 is shown in FIG. 18. Property values found from the transmittance spectrum are shown in Table 5.

The results for Examples 17 and 18 indicate that even when PLYSURF A215C is used as the phosphoric acid ester, the resulting liquid composition, resin-containing liquid composition, and optical filter have good transmittance properties.

Example 19

(Preparation of Liquid Composition 11)

Figure 19:
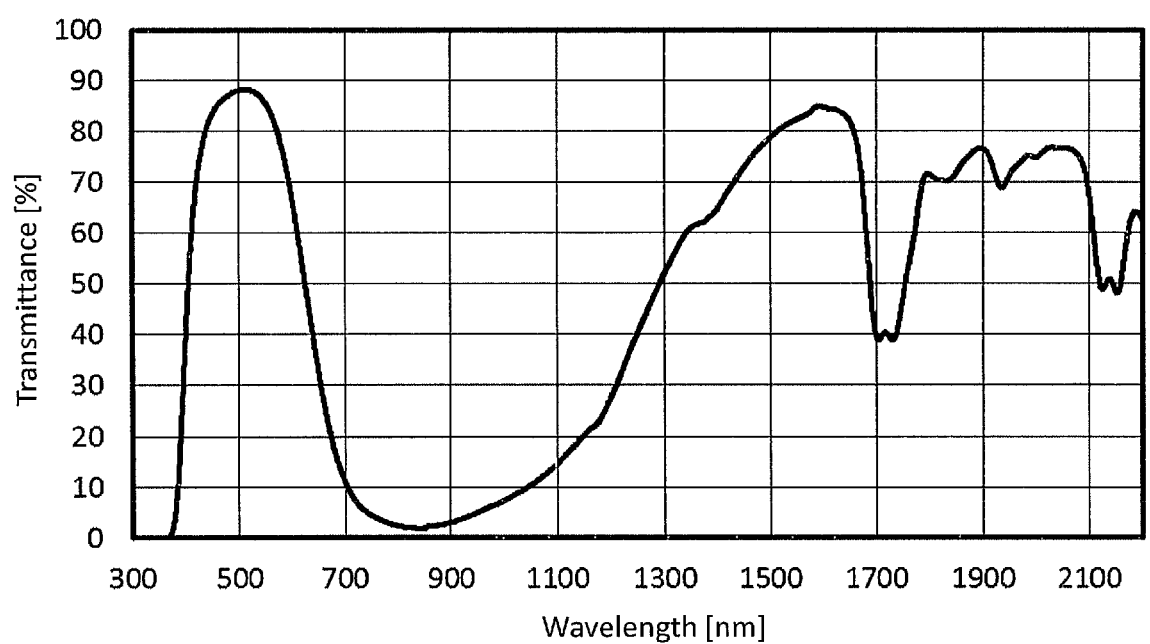
FIG. 19 shows a transmittance spectrum of a liquid composition 11.

A liquid composition 11 was prepared in the same manner as for the liquid composition 1, except that PLYSURF A212C (manufactured by DKS Co., Ltd.; HLB value: 11) was used as the phosphoric acid ester instead of PLYSURF A219B and the amounts of the raw materials added were adjusted as shown in Table 1. A transmittance spectrum of the liquid composition 11 is shown in FIG. 19. Property values found from the transmittance spectrum are shown in Table 2.

(Preparation of Resin-Containing Liquid Composition)

Figure 20:
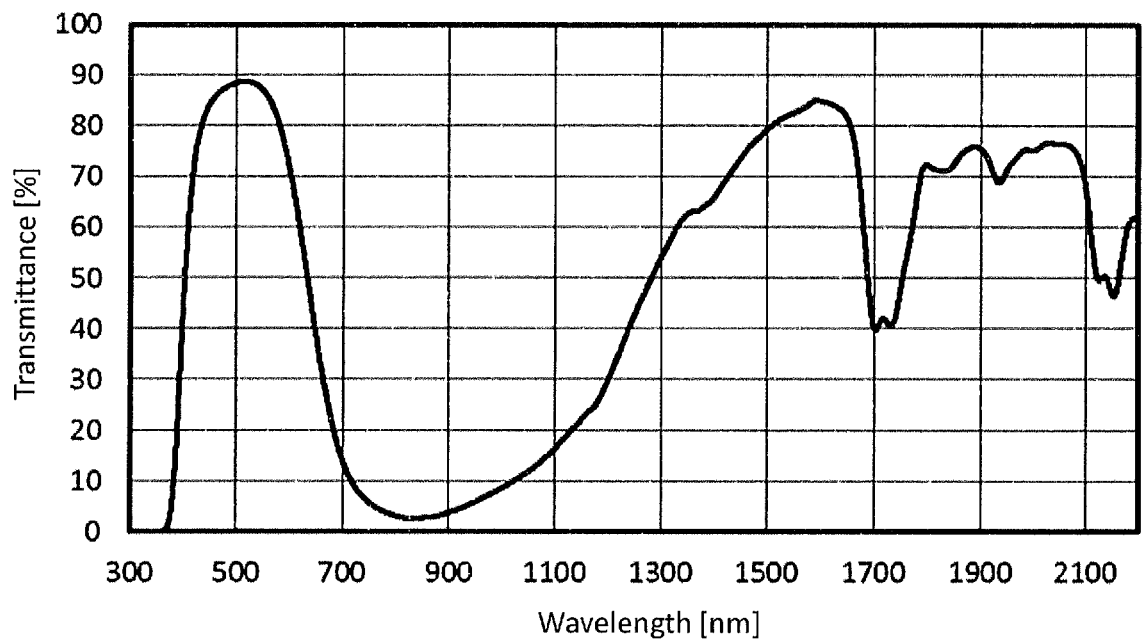
FIG. 20 shows a transmittance spectrum of a resin containing liquid composition 11-1.

A resin-containing liquid composition 11-1 was prepared in the same manner as for the resin-containing liquid composition 1-1, except that, as shown in Table 3, the liquid composition 11 was used instead of the liquid composition 1 and the amounts of the matrix resin added and the liquid composition added were adjusted. A transmittance spectrum of the resin-containing liquid composition 11-1 is shown in FIG. 20. Property values found from the transmittance spectrum are shown in Table 4.

(Production of Optical Filter)

Figure 21:
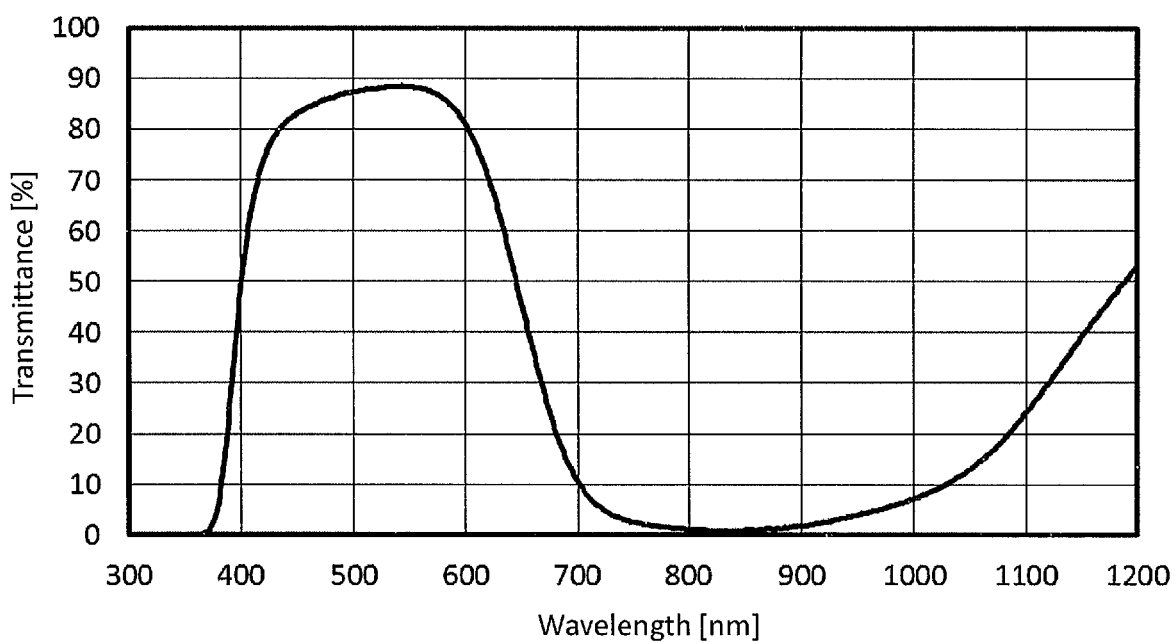
FIG. 21 shows a transmittance spectrum of an optical filter according to Example 19.

An optical filter according to Example 19 was produced in the same manner as for the optical filter according to Example 1, except that the resin-containing liquid composition 11-1 was used instead of the resin-containing liquid composition 1-1. A transmittance spectrum of the optical filter according to Example 19 is shown in FIG. 21. Property values found from the transmittance spectrum are shown in Table 5.

Example 20

(Preparation of Resin-Containing Liquid Composition)

Figure 22:
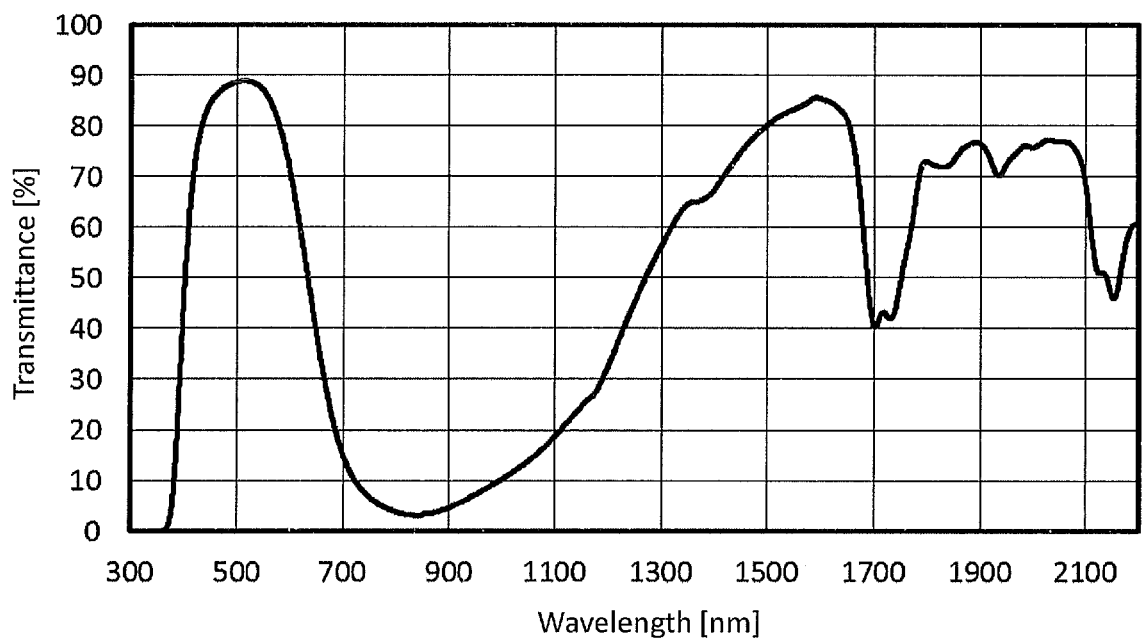
FIG. 22 shows a transmittance spectrum of a resin-containing liquid composition 11-2.

A resin-containing liquid composition 11-2 was prepared in the same manner as for the resin-containing liquid composition 1-1, except that, as shown in Table 3, the liquid composition 11 was used instead of the liquid composition 1 and the amounts of the matrix resin added and the liquid composition added were adjusted. A transmittance spectrum of the resin-containing liquid composition 11-2 is shown in FIG. 22. Property values found from the transmittance spectrum are shown in Table 4.

(Production of Optical Filter)

Figure 23:
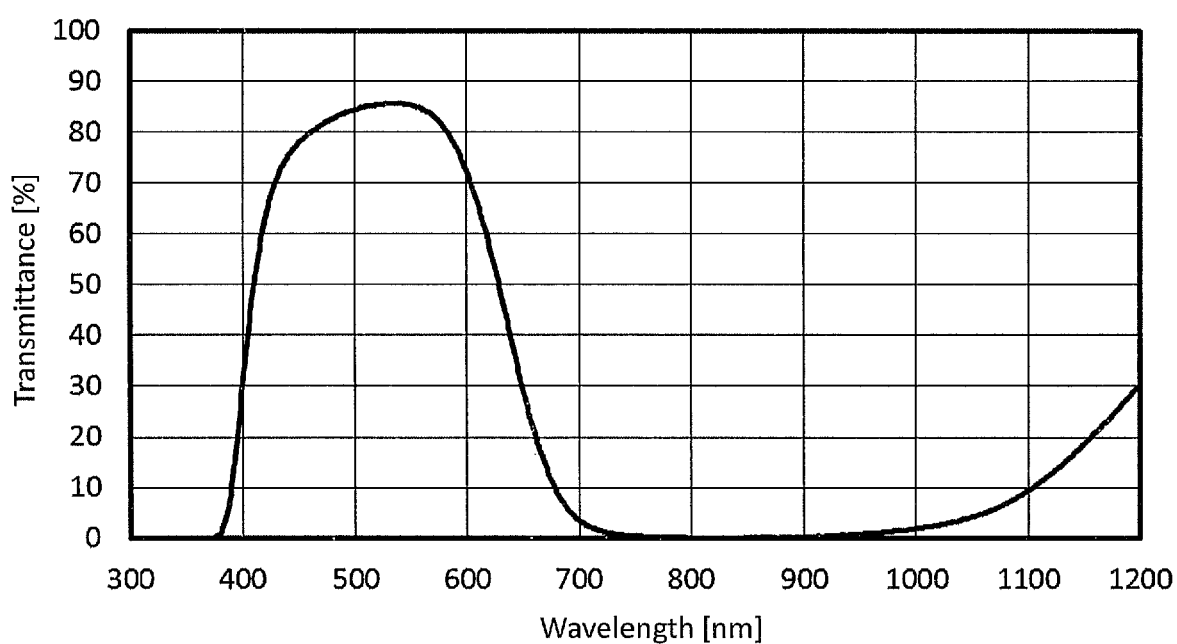
FIG. 23 shows a transmittance spectrum of an optical filter according to Example 20.

An optical filter according to Example 20 was produced in the same manner as for the optical filter according to Example 1, except that the resin-containing liquid composition 11-2 was used instead of the resin-containing liquid composition 1-1. A transmittance spectrum of the optical filter according to Example 20 is shown in FIG. 23. Property values found from the transmittance spectrum are shown in Table 5.

The results for Examples 19 and 20 indicate that even when PLYSURF A212C is used as the phosphoric acid ester, the resulting liquid composition, resin-containing liquid composition, and optical filter have good transmittance properties.

Example 21

(Preparation of Liquid Composition 12)

Figure 24:
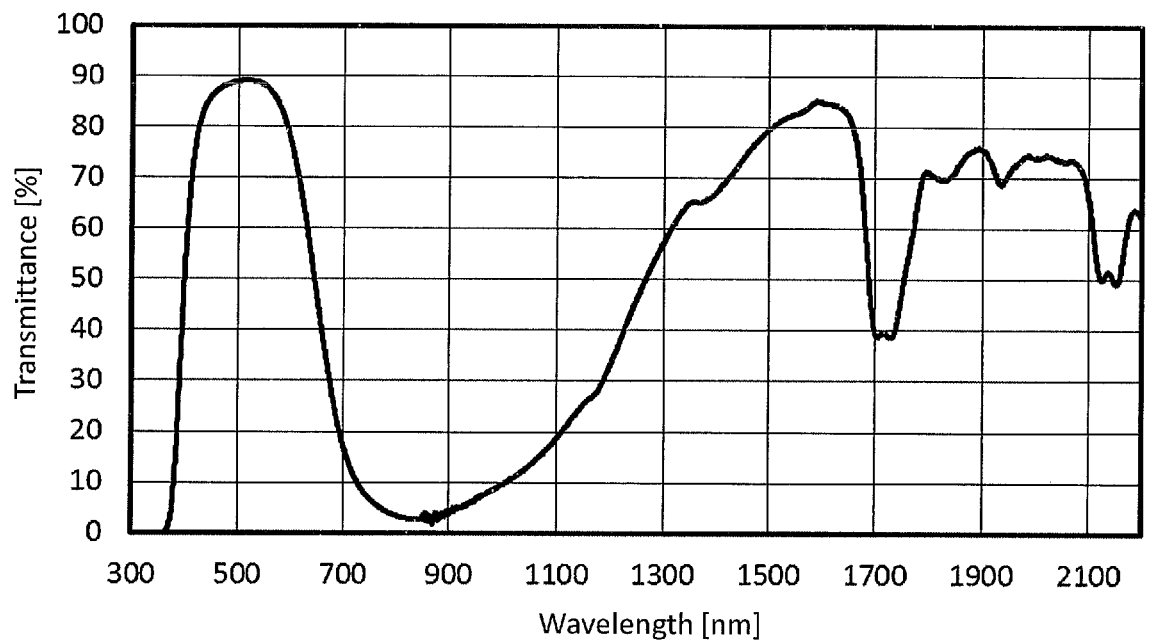
FIG. 24 shows a transmittance spectrum of a liquid composition 12.

A liquid composition 12 was prepared in the same manner as for the liquid composition 1, except that PLYSURF A208N (manufactured by DKS Co., Ltd.; HLB value: 7) was used as the phosphoric acid ester instead of PLYSURF A219B and the amounts of the raw materials added were adjusted as shown in Table 1. A transmittance spectrum of the liquid composition 12 is shown in FIG. 24. Property values found from the transmittance spectrum are shown in Table 2.

(Preparation of Resin-Containing Liquid Composition)

Figure 25:
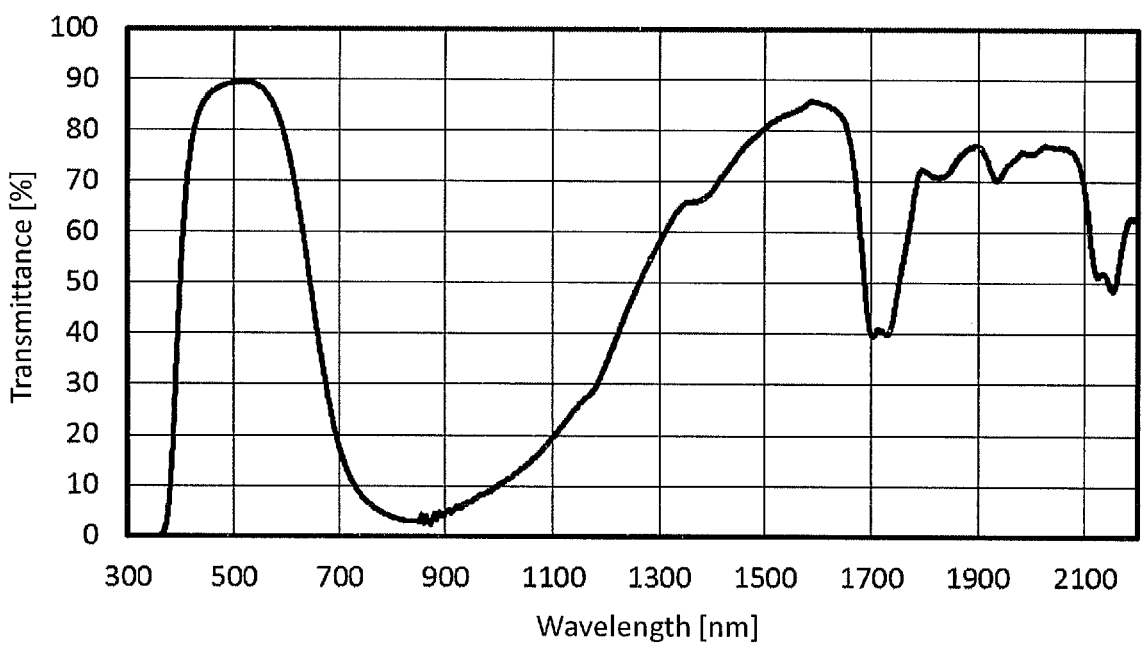
FIG. 25 shows a transmittance spectrum of a resin-containing liquid composition 12-1.

A resin-containing liquid composition 12-1 was prepared in the same manner as for the resin-containing liquid composition 1-1, except that, as shown in Table 3, the liquid composition 12 was used instead of the liquid composition 1 and the amounts of the matrix resin added and the liquid composition added were adjusted. A transmittance spectrum of the resin-containing liquid composition 12-1 is shown in FIG. 25. Property values found from the transmittance spectrum are shown in Table 4.

(Production of Optical Filter)

Figure 26:
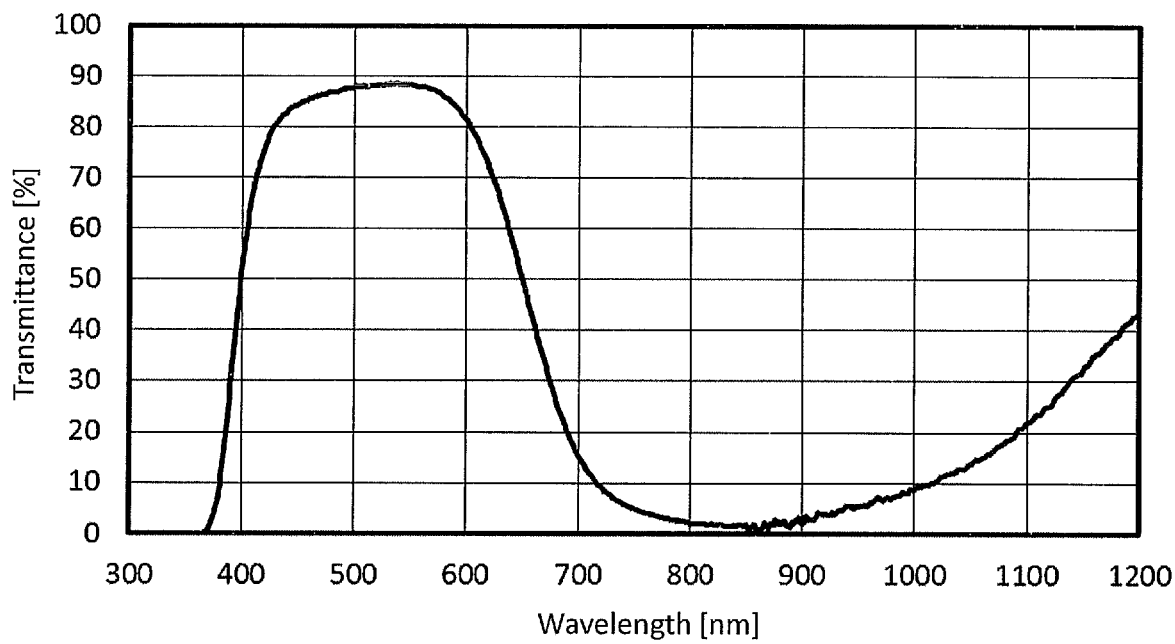
FIG. 26 shows a transmittance spectrum of an optical filter according to Example 21.

An optical filter according to Example 21 was produced in the same manner as for the optical filter according to Example 1, except that the resin-containing liquid composition 12-1 was used instead of the resin-containing liquid composition 1-1. A transmittance spectrum of the optical filter according to Example 21 is shown in FIG. 26. Property values found from the transmittance spectrum are shown in Table 5.

Example 22

(Preparation of Resin-Containing Liquid Composition)

Figure 27:
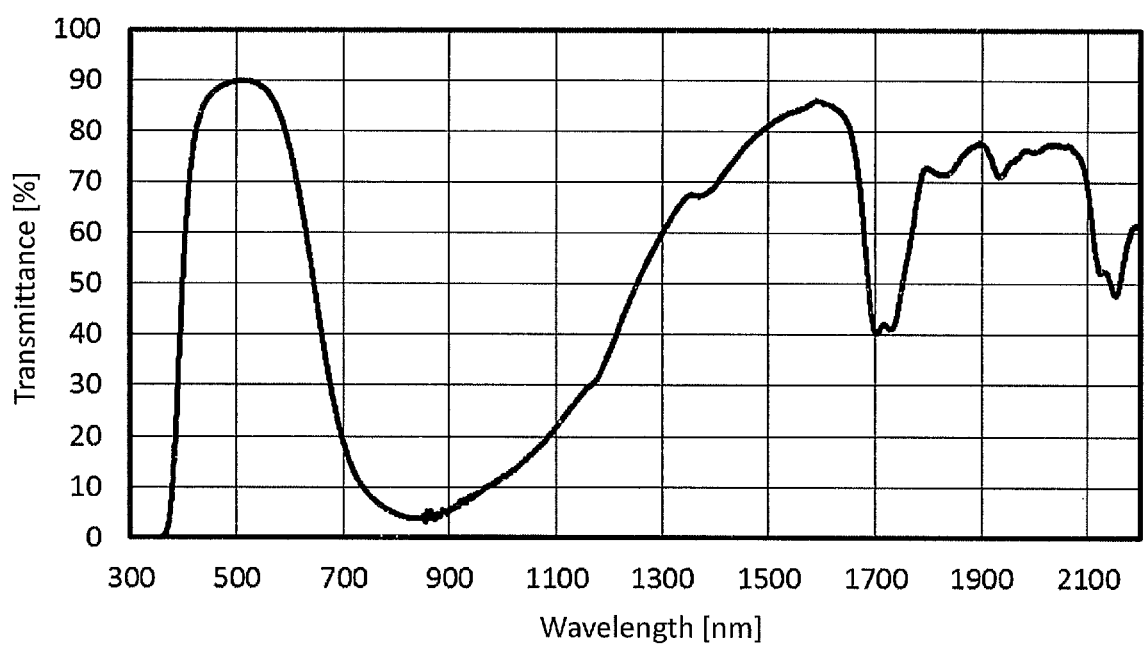
FIG. 27 shows a transmittance spectrum of a resin-containing liquid composition 12-2.

A resin-containing liquid composition 12-2 was prepared in the same manner as for the resin containing liquid composition 1-1, except that, as shown in Table 3, the liquid composition 12 was used instead of the liquid composition 1 and the amounts of the matrix resin added and the liquid composition added were adjusted. A transmittance spectrum of the resin containing liquid composition 12-2 is shown in FIG. 27. Property values found from the transmittance spectrum are shown in Table 4.

(Production of Optical Filter)

Figure 28:
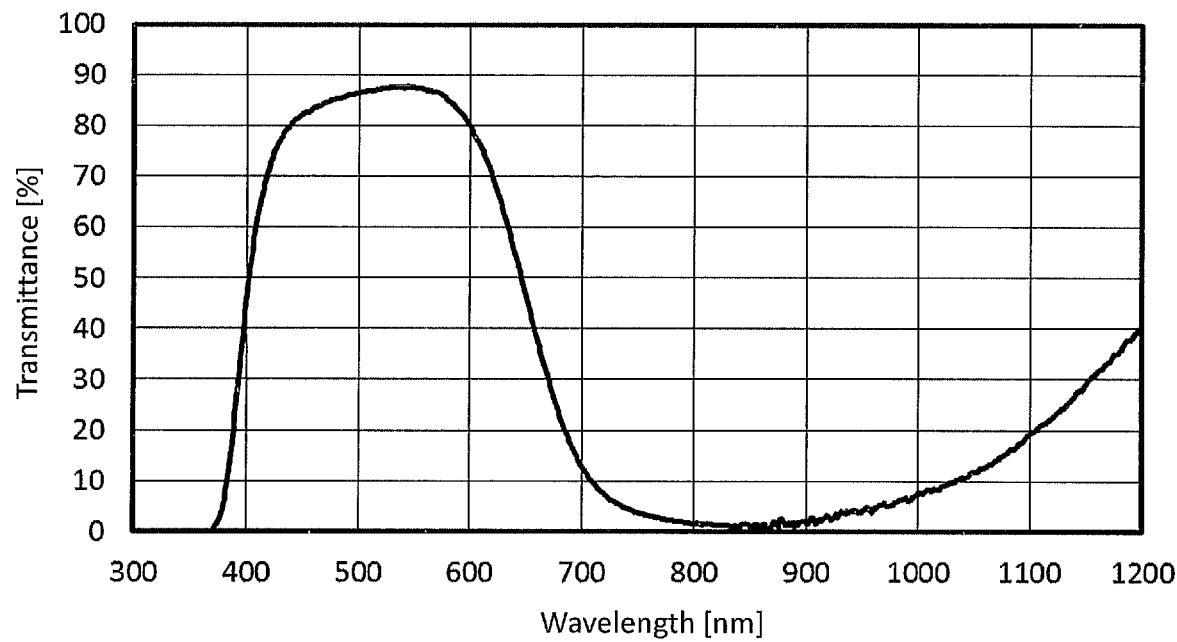
FIG. 28 shows a transmittance spectrum of an optical filter according to Example 22.

An optical filter according to Example 22 was produced in the same manner as for the optical filter according to Example 1, except that the resin-containing liquid composition 12-2 was used instead of the resin-containing liquid composition 1-1. A transmittance spectrum of the optical filter according to Example 22 is shown in FIG. 28. Property values found from the transmittance spectrum are shown in Table 5.

Example 23

(Preparation of Liquid Composition 13)

A liquid composition 13 was prepared in the same manner as for the liquid composition 1, except that PLYSURF A208N (manufactured by DKS Co., Ltd.; HLB value: 7) was used as the phosphoric acid ester instead of PLYSURF A219B and the amounts of the raw materials added were adjusted as shown in Table 1. Property values found from a transmittance spectrum of the liquid composition 13 are shown in Table 2.

(Preparation of Resin-Containing Liquid Composition)

A resin-containing liquid composition 13-1 was prepared in the same manner as for the resin-containing liquid composition 1-1, except that, as shown in Table 3, the liquid composition 13 was used instead of the liquid composition 1 and the amounts of the matrix resin added and the liquid composition added were adjusted. Property values found from a transmittance spectrum of the resin-containing liquid composition 13-1 are shown in Table 4.

(Production of Optical Filter)

An optical filter according to Example 23 was produced in the same manner as for the optical filter according to Example 1, except that the resin-containing liquid composition 13-1 was used instead of the resin-containing liquid composition 1-1. Property values found from a transmittance spectrum of the optical filter according to Example 23 are shown in Table 5.

Example 24

(Preparation of Resin-Containing Liquid Composition)

A resin-containing liquid composition 13-2 was prepared in the same manner as for the resin-containing liquid composition 1-1, except that, as shown in Table 3, the liquid composition 13 was used instead of the liquid composition 1 and the amounts of the matrix resin added and the liquid composition added were adjusted. Property values found from a transmittance spectrum of the resin-containing liquid composition 13-2 are shown in Table 4.

(Production of Optical Filter)

An optical filter according to Example 24 was produced in the same manner as for the optical filter according to Example 1, except that the resin-containing liquid composition 13-2 was used instead of the resin-containing liquid composition 1-1. Property values found from a transmittance spectrum of the optical filter according to Example 24 are shown in Table 5.

The results for Examples 21 to 24 indicate that even when PLYSURF A208N is used as the phosphoric acid ester, the resulting liquid composition, resin-containing liquid composition, and optical filter have good transmittance properties.

Example 25

(Preparation of Liquid Composition 14)

Figure 29:
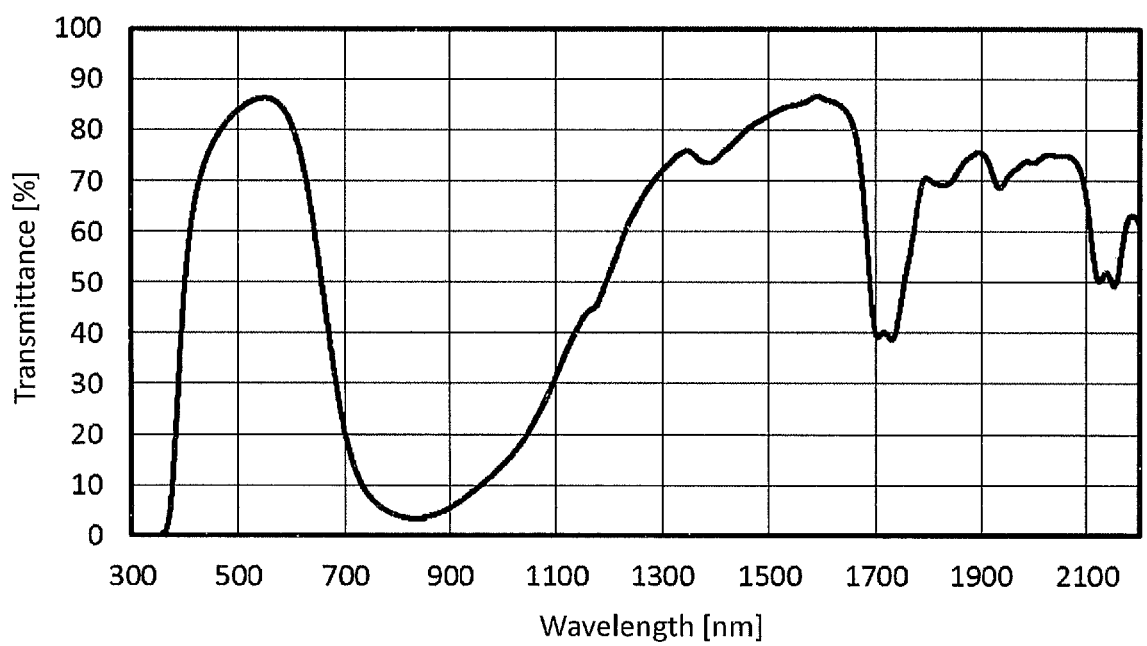
FIG. 29 shows a transmittance spectrum of a liquid composition 14.

A liquid composition 14 was prepared in the same manner as for the liquid composition 1, except that PLYSURF A208F (manufactured by DKS Co., Ltd.; HLB value: 9) was used as the phosphoric acid ester instead of PLYSURF A219B and the amounts of the raw materials added were adjusted as shown in Table 1. A transmittance spectrum of the liquid composition 14 is shown in FIG. 29. Property values found from the transmittance spectrum are shown in Table 2.

(Preparation of Resin-Containing Liquid Composition)

Figure 30:
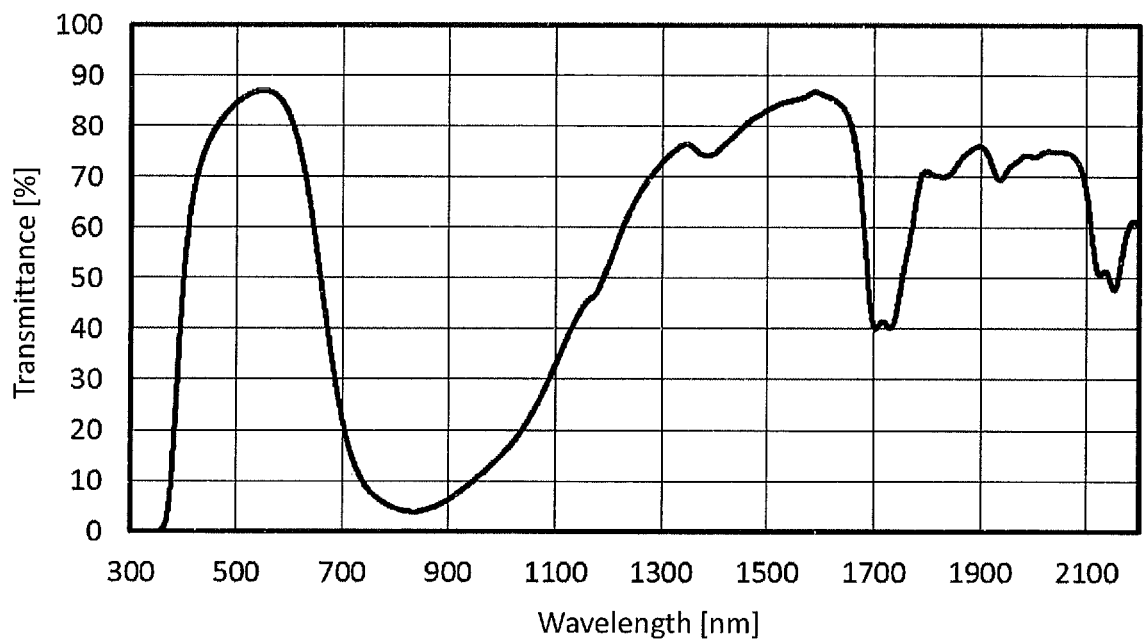
FIG. 30 shows a transmittance spectrum of a resin-containing liquid composition 14-1.

A resin-containing liquid composition 14-1 was prepared in the same manner as for the resin-containing liquid composition 1-1, except that, as shown in Table 3, the liquid composition 14 was used instead of the liquid composition 1 and the amounts of the matrix resin added and the liquid composition added were adjusted. A transmittance spectrum of the resin-containing liquid composition 14-1 is shown in FIG. 30. Property values found from the transmittance spectrum are shown in Table 4.

(Production of Optical Filter)

Figure 31:
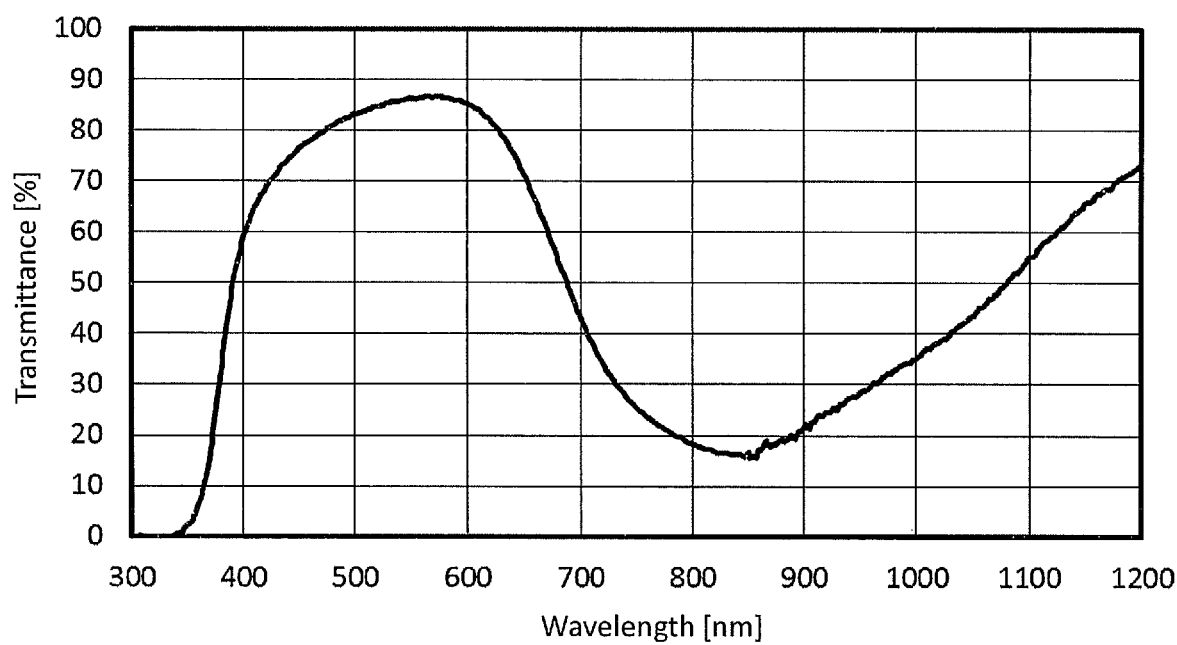
FIG. 31 shows a transmittance spectrum of an optical filter according to Example 25.

An optical filter according to Example 25 was produced in the same manner as for the optical filter according to Example 1, except that the resin-containing liquid composition 14-1 was used instead of the resin-containing liquid composition 1-1. A transmittance spectrum of the optical filter according to Example 25 is shown in FIG. 31. Property values found from the transmittance spectrum are shown in Table 5.

The results for Example 25 indicate that even when PLYSURF A208F is used as the phosphoric acid ester, the resulting liquid composition, resin-containing liquid composition, and optical filter have good transmittance properties.

Comparative Example (Preparation of Liquid Composition 15 and Composition 16)

A liquid composition 15 was prepared in the same manner as for the liquid composition 1, except for the followings. PLYSURF A208F (manufactured by DKS Co., Ltd.; HLB value: 9) was used as the phosphoric acid ester instead of PLYSURF A219B. Toluene (TL) was used instead of cyclopentanone. The raw materials except for MTES and TEOS were added as shown in Table 1.

A composition 16 was prepared in the same manner as for the liquid composition 1, except for the followings. PLYSURF A208F (manufactured by DKS Co., Ltd.; HLB value: 9) was used as the phosphoric acid ester instead of PLYSURF A219B. The raw materials except for MTES and TEOS were added as shown in Table 1. A product formed by the phenyl-based phosphonic acid and copper ion aggregated in the composition 16. Additionally, the composition 16 was a jelly and had a high viscosity.

The composition 16 was a whitish green jelly having a low transparency and was far from a composition having good optical properties. It seems that in the case of the composition 16, cyclopentanone which has higher polarity than that of toluene caused aggregation of the product formed by the phenyl-based phosphonic acid and copper ion in the solvent replacement carried out using the rotary evaporator. It is thought that even under the presence of the phosphoric acid ester, a low-polarity product formed by the phenyl-based phosphonic acid and copper ion has low dispersibility in an organic solvent having high polarity. This indicates that even under the presence of the phosphoric acid ester, it is difficult to appropriately prepare a liquid composition containing a light absorber formed by the phenyl-based phosphonic acid and copper ion without using a low-polarity organic solvent such as toluene or xylene.

The phosphoric acid ester was added to prepare a highly transparent liquid composition or a highly transparent resin-containing liquid composition. The liquid compositions 4, 10, 11, and 12 respectively contain PLYSURF A219B (HLB value: 16), PLYSURF A215C (HLB value: 11), PLYSURF A212C (HLB value: 11), and PLYSURF A208N (HLB value: 7) as the phosphoric acid ester. Good dispersibility of the light absorber was successfully ensured by addition of the alkoxysilanes expected to serve the same function as the phosphoric acid ester in terms of preventing aggregation of the light absorber formed by the phosphonic acid and copper ion. This made it possible to greatly decrease the content of the phosphoric acid ester in the liquid compositions. It is thought that the alkoxysilanes serve to cause some action between the light absorber formed by the phosphonic acid and copper ion and the organic solvent to prevent aggregation of the light absorber in the organic solvent.

Moreover, according to the liquid compositions 4, 10, 11, and 12, the light absorber formed by the phosphonic acid and copper ion did not form an aggregation-even when the phosphoric acid ester and the organic solvent were not very consistent with each other in polarity. This indicates that generation and dispersion of the light absorber formed by the phenyl-based phosphonic acid and copper ion can be achieved with the use of phosphoric acid esters having widely varying HLB values. The content of the phosphoric acid ester in each of the liquid compositions 4, 10, 11, and 12 was about one-fourth of the content of the phosphoric acid ester in the liquid composition 14. Additionally, the four different phosphoric acid esters having the different HLB values in the range of 7 to 16 were used in the liquid compositions 4, 10, 11, and 12. As just indicated by the liquid compositions 4, 10, 11, and 12, a toluene-free liquid composition containing the light absorber formed by the phenyl-based phosphonic acid and copper ion can be prepared using the phosphoric acid ester having an HLB value of 7 to 16.

It can be thought that when phosphoric acid esters having widely varying HLB values are able to be used, it is possible to choose characteristics to be imparted to a liquid composition by a phosphoric acid ester used and to adjust the characteristics or properties of a liquid composition and an optical filter in a wider range. For example, a phosphoric acid ester having high lipophilicity can be used in combination with a solvent having low lipophilicity. Since a phosphoric acid ester with high lipophilicity has low affinity for water, an optical filter produced using a liquid composition containing a phosphoric acid ester having high lipophilicity is likely to have high humidity resistance. Preparation of a liquid composition for optical filters using an organic solvent having higher polarity than that of toluene requires a phosphoric acid ester having a high HLB value and low lipophilicity and therefore has been disadvantageous in increasing the humidity resistance of an optical filter. However, addition of the alkoxysilane or the hydrolysate of an alkoxysilane to a liquid composition allows the use of a phosphoric acid ester having a low HLB value and high lipophilicity and also achievement of a toluene-free liquid composition using a high-polarity organic solvent. Therefore, both a toluene-free liquid composition prepared using a high-polarity organic solvent and an optical filter having high humidity resistance, which have been considered difficult to achieve at the same time, can be achieved. Furthermore, both a decrease in the content of toluene in the liquid composition and an optical filter having high humidity resistance can be achieved.

According to the liquid compositions 2, 3, 4, and 8, addition of the alkoxysilanes enables a great decrease in the content of the phosphoric acid ester, and a resin-containing liquid composition having good properties, like the resin-containing liquid compositions 2-1, 2-2, and 8-1, can be prepared with a relatively small amount of the phosphoric acid ester, as in the case of the liquid compositions 2 and 8. The liquid composition 3 indicates that the acceptable range of the amount of the phosphoric acid ester added to prepare a resin-containing liquid composition having good properties is sufficiently wide. When the ratio of the amount of the alkoxysilanes added to the amount of the phosphoric acid ester added, which is shown in Table 1, is in the range of 0.96 (liquid composition 14) to 31.96 (liquid composition 8) in terms of mass, the liquid compositions and the resin-containing liquid compositions have good properties.

Since hydrolysates of the alkoxysilanes have a lot of silanol groups, curing of the resulting liquid composition is thought to cause formation of a network of the silanol groups. This is thought to contribute to improvement in heat resistance and humidity resistance and allow formation of a rigid cured product. In this respect, an increase in the amount of the alkoxysilanes added is advantageous. However, in some cases, too large an amount of the alkoxysilanes added can be a cause of cracking in post-curing carried out after film formation. Meanwhile, it is thought that the phosphoric acid ester, which has an organic chain having a relatively high molecular weight or bulk, such as a polyoxyalkyl group, imparts flexibility to a cured product of the resulting liquid composition. Therefore, an increase in the amount of the phosphoric acid ester added can enhance the anti-cracking effect. At the same time, the phosphoric acid ester tends to be hydrolyzed under a high humidity environment and is unlikely to increase the humidity resistance of an optical filter. That is, it is thought that while the alkoxysilanes and the phosphoric acid ester have the common function, namely, prevention of aggregation of the light absorber, in preparation of the liquid composition and the resin-containing liquid composition, they are in a mutually complementary relationship from the viewpoint of the mechanical properties, the weather resistance, etc. in curing the liquid composition or the resin-containing liquid composition. Therefore, it is desirable in terms of producing an optical filter that the ratio of the amount of the alkoxysilanes added to the amount of the phosphoric acid ester added in terms of mass can be chosen from a wide range for the liquid composition.

Addition of the alkoxysilanes to the liquid composition can decrease the content of the phosphoric acid ester in the resin-containing liquid composition to 0.54% in terms of mass (refer to the resin-containing liquid composition 8-1). Addition of the alkoxysilanes to the liquid composition can also decrease the ratio of the content of the phosphoric acid ester to the content of the phosphonic acid to 0.13 in terms of mass in the liquid composition (refer to the liquid composition 8). These are very advantageous, as described above, in terms of producing an optical filter having high humidity resistance.

For the liquid compositions 1 to 14, the content of the alkoxysilane-derived solids in the liquid composition was calculated assuming that the whole alkoxysilanes added to the liquid composition underwent hydrolytic polycondensation. The largest content of the solids in the liquid composition was 6.49% (refer to the liquid composition 8). This calculation was carried out on the basis that the mass of solids derived from MTES and the mass of solids derived from TEOS were respectively 37.64% and 28.84% with respect to the amounts of MTES and TEOS added.

Among the liquid compositions 1, 3, 5, and 6, the amount of cyclopentanone, which is the organic solvent, greatly varies in the range of 20 to 70 g, and the ratio of the content of the phosphoric acid ester to the mass of the resin-containing liquid composition and the ratio of the content of the alkoxysilanes to the mass of the resin-containing liquid composition also greatly vary. It is understood that resin-containing liquid compositions having good properties can be prepared even in a case like this.

Comparison between the liquid composition 7 and the liquid composition 2 has revealed that the amount of the alkoxysilanes added for the liquid composition 7 is twice as large as the amount of the alkoxysilanes added for the liquid composition 2. It is understood from the comparison between the liquid composition 7 and the liquid composition 2 that resin-containing liquid compositions having good properties, like the resin-containing liquid compositions 7-1 and 7-2, can be prepared by adding the same raw materials and greatly different amounts, namely, at a ratio of about 1 to 2, of the alkoxysilanes. As can be seen from the above, the amount of the alkoxysilanes added is not limited to a particular value.

Comparison between the liquid composition 13 and the liquid composition 2 has revealed that the phosphoric acid ester contained in the liquid composition 2 is PLYSURF A219B (HLB value: 16) and the phosphoric acid ester contained in the liquid composition 13 is PLYSURF A208N (HLB value: 7). It is understood from the liquid composition 13 that a favorable liquid composition can be prepared by changing the phosphoric acid ester used even when the component composition of the liquid composition is different from the component compositions (base compositions) of the liquid compositions 4, 10, 11, and 12 and that a phosphoric acid ester having a different HLB value can be chosen not only under the specific component composition conditions.

It is understood from the liquid composition 9 and the resin-containing liquid composition 9-1 that a favorable liquid composition and a favorable resin-containing liquid composition can be prepared using an organic solvent other than cyclopentanone, such as cyclohexanone, as the organic solvent.

The preparation conditions, the yield, and the appearance of the liquid compositions 1 to 16 are shown in Table 1. The transmittance properties of the samples of the liquid compositions 1 to 14 are shown in Table 2. It is understood from the results that the liquid compositions 1 to 14 have good optical properties demonstrated by absorption and blocking of both near-ultraviolet and near-infrared light.

The preparation conditions of the resin-containing liquid compositions produced by mixing the liquid compositions 1 to 14 and the silicone resin serving as a matrix resin and the transmittance properties of the samples of the resin-containing liquid compositions are shown in Table 4. Since the silicone resin (KR-300) includes 50 mass % of xylene as a solvent, the resin-containing liquid compositions each contained a certain amount of xylene. The transmittance properties of the optical filters produced using the resin-containing liquid compositions are shown in Table 5. It is understood that the optical filters produced using the resin-containing liquid compositions have good optical properties.

TABLE 1

| | Amount of raw material added | | | | | | |
|---|---|---|---|---|---|---|---|
| | Phosphonic acid [g] | | Phosphoric acid ester | | Alkoxysilane [g] | | Solvent |
| | Phenyl-phosphonic acid | Bromophenyl-phosphonic acid | Type (PLYSURF) | Amount [g] | MTES | TEOS | Type |
| Liquid composition 1 | 0.357 | 2.143 | A219B | 3.000 | 4.332 | 1.420 | CP |
| Liquid composition 2 | 0.384 | 2.300 | A219B | 0.722 | 4.332 | 1.420 | CP |
| Liquid composition 3 | 0.357 | 2.143 | A219B | 3.000 | 4.332 | 1.420 | CP |
| Liquid composition 4 | 0.375 | 2.246 | A219B | 1.500 | 4.332 | 1.420 | CP |
| Liquid composition 5 | 0.357 | 2.143 | A219B | 3.000 | 4.332 | 1.420 | CP |
| Liquid composition 6 | 0.357 | 2.143 | A219B | 3.000 | 4.332 | 1.420 | CP |
| Liquid composition 7 | 0.384 | 2.300 | A219B | 0.722 | 8.664 | 2.840 | CP |
| Liquid composition 8 | 0.388 | 2.326 | A219B | 0.360 | 8.664 | 2.840 | CP |
| Liquid composition 9 | 0.375 | 2.246 | A219B | 1.500 | 4.332 | 1.420 | CH |
| Liquid composition 10 | 0.375 | 2.246 | A215C | 1.500 | 4.332 | 1.420 | CP |
| Liquid composition 11 | 0.375 | 2.246 | A215C | 1.500 | 4.332 | 1.420 | CP |
| Liquid composition 12 | 0.375 | 2.246 | A208N | 1.500 | 4.332 | 1.420 | CP |
| Liquid composition 13 | 0.384 | 2.300 | A208N | 0.722 | 4.332 | 1.420 | CP |
| Liquid composition 14 | 0.323 | 1.936 | A208F | 6.000 | 4.332 | 1.420 | CP |
| Liquid composition 15 | 0.323 | 1.936 | A208F | 6.000 | 0 | 0 | TL |
| Composition 16 | 0.323 | 1.936 | A208F | 6.000 | 0 | 0 | CP |

TABLE 1-continued

| | Amount of raw material added Solvent | Mass ratio of components | | | | Liquid composition | |
|---|---|---|---|---|---|---|---|
| | | Phosphoric acid ester/ phosphonic acid | Phosphoric acid ester/ liquid composition | Alkoxysilane/ phosphoric acid ester | Alkoxysilane-derived solids/liquid composition | Solvent having a relative permittivity of 7 or less/liquid composition | |
| | Amount [g] | | | | | | Yield [g] | Appearance |
| Liquid composition 1 | 40 | 1.20 | 5.31% | 1.92 | 3.61% | 0.00% | 56.47 | Good |
| Liquid composition 2 | 80 | 0.27 | 0.70% | 7.97 | 1.98% | 0.00% | 103.20 | Good |
| Liquid composition 3 | 70 | 1.20 | 3.23% | 1.92 | 2.19% | 0.00% | 92.95 | Good |
| Liquid composition 4 | 40 | 0.57 | 2.73% | 3.83 | 3.71% | 0.00% | 54.97 | Good |
| Liquid composition 5 | 30 | 1.20 | 7.17% | 1.92 | 4.87% | 0.00% | 41.86 | Good |
| Liquid composition 6 | 20 | 1.20 | 8.35% | 1.92 | 5.68% | 0.00% | 35.91 | Good |
| Liquid composition 7 | 40 | 0.27 | 1.15% | 15.93 | 6.52% | 0.00% | 62.56 | Good |
| Liquid composition 8 | 40 | 0.13 | 0.57% | 31.96 | 6.49% | 0.00% | 62.87 | Good |
| Liquid composition 9 | 20 | 0.57 | 2.39% | 3.83 | 3.25% | 0.00% | 62.75 | Good |
| Liquid composition 10 | 40 | 0.57 | 2.59% | 3.83 | 3.52% | 0.00% | 57.98 | Good |
| Liquid composition 11 | 40 | 0.57 | 2.98% | 3.83 | 4.05% | 0.00% | 50.42 | Good |
| Liquid composition 12 | 40 | 0.57 | 2.66% | 3.83 | 3.62% | 0.00% | 56.30 | Good |
| Liquid composition 13 | 40 | 0.27 | 1.31% | 7.97 | 3.70% | 0.00% | 55.11 | Good |
| Liquid composition 14 | 40 | 2.66 | 10.50% | 0.96 | 3.57% | 0.00% | 57.15 | Good |
| Liquid composition 15 | 40 | 2.66 | 13.13% | 0.00 | 0.00% | 50%< | 45.70 | Good |
| Composition 16 | 40 | 2.66 | 11.10% | 0.00 | 0.00% | 0.00% | 54.08 | Jelly |

TABLE 2

| | Optical properties of liquid composition | | | | | | | | |
|---|---|---|---|---|---|---|---|---|---|
| | UV cut-off wavelength [nm] | IR cut-off wavelength [nm] | Average transmittance in wavelength range of 300 to 350 nm [%] | Average transmittance in wavelength range of 300 to 370 [%] | Average transmittance in wavelength range of 400 to 600 nm [%] | Average transmittance in wavelength range of 450 to 600 nm [%] | Transmittance at wavelength of 800 nm [%] | Transmittance at wavelength of 900 nm [%] | Transmittance at wavelength of 1100 nm [%] |
| Liquid composition 1 | 402 | 630 | 0.0 | 0.1 | 82.2 | 85.4 | 3.6 | 4.3 | 16.8 |
| Liquid composition 2 | 395 | 663 | 0.1 | 0.8 | 83.2 | 85.8 | 19.4 | 22.3 | 43.1 |
| Liquid composition 3 | 392 | 674 | 0.1 | 0.9 | 87.1 | 89.0 | 16.9 | 17.6 | 37.1 |
| Liquid composition 4 | 405 | 622 | 0.0 | 0.0 | 79.7 | 83.2 | 3.2 | 5.0 | 18.7 |
| Liquid composition 5 | 409 | 613 | 0.0 | 0.0 | 78.2 | 82.2 | 1.0 | 1.3 | 8.5 |
| Liquid composition 6 | 410 | 608 | 0.0 | 0.0 | 77.4 | 81.6 | 0.5 | 0.8 | 6.4 |
| Liquid composition 7 | 403 | 608 | 0.0 | 0.1 | 78.4 | 81.4 | 6.0 | 8.9 | 27.2 |
| Liquid composition 8 | 407 | 604 | 0.0 | 0.1 | 75.0 | 78.4 | 6.2 | 9.5 | 28.4 |
| Liquid composition 9 | 402 | 632 | 0.0 | 0.1 | 82.3 | 85.5 | 5.5 | 6.7 | 22.0 |
| Liquid composition 10 | 403 | 626 | 0.0 | 0.1 | 81.2 | 84.4 | 3.5 | 4.9 | 17.4 |
| Liquid composition 11 | 405 | 625 | 0.0 | 0.0 | 80.4 | 84.0 | 2.4 | 3.0 | 14.6 |
| Liquid composition 12 | 399 | 645 | 0.0 | 0.1 | 84.3 | 87.0 | 3.5 | 4.1 | 18.8 |

TABLE 2-continued

| | Optical properties of liquid composition | | | | | | | | |
|---|---|---|---|---|---|---|---|---|---|
| | UV cut-off wave-length [nm] | IR cut-off wave-length [nm] | Average transmit-tance in wavelength range of 300 to 350 nm [%] | Average transmit-tance in wavelength range of 300 to 370 [%] | Average transmit-tance in wavelength range of 400 to 600 nm [%] | Average transmit-tance in wavelength range of 450 to 600 nm [%] | Transmit-tance at wavelength of 800 nm [%] | Transmit-tance at wavelength of 900 nm [%] | Transmit-tance at wavelength of 1100 nm [%] |
| Liquid composition 13 | 405 | 629 | 0.0 | 0.0 | 80.2 | 83.3 | 3.4 | 4.0 | 19.2 |
| Liquid composition 14 | 401 | 657 | 0.0 | 0.2 | 79.5 | 83.7 | 3.9 | 5.6 | 31.5 |

TABLE 3

| | | Amount of raw material added | | Mass ratio of components | | |
|---|---|---|---|---|---|---|
| Resin-containing liquid composition | Liquid composition used | Liquid composition [g] | Silicone resin (KR-300) [g] | Phosphoric acid ester/resin-containing liquid composition | Alkoxysilane-derived solids/resin-containing liquid composition | Solvent having a relative permittivity of 7 or less/resin-containing liquid composition |
| 1-1 | 1 | 22.59 | 1.76 | 4.93% | 3.35% | 3.61% |
| 1-2 | 1 | 22.59 | 3.52 | 4.60% | 3.13% | 6.74% |
| 2-1 | 2 | 41.28 | 1.76 | 0.67% | 1.90% | 2.04% |
| 2-2 | 2 | 41.28 | 3.52 | 0.64% | 1.82% | 3.93% |
| 3-1 | 3 | 37.18 | 1.76 | 3.08% | 2.10% | 2.26% |
| 3-2 | 3 | 37.18 | 3.52 | 2.95% | 2.01% | 4.32% |
| 4-1 | 4 | 21.99 | 1.76 | 2.53% | 3.44% | 3.71% |
| 4-2 | 4 | 21.99 | 3.52 | 2.35% | 3.20% | 6.90% |
| 5-1 | 5 | 16.74 | 1.76 | 6.49% | 4.41% | 4.76% |
| 5-2 | 5 | 16.74 | 3.52 | 5.92% | 4.03% | 8.69% |
| 6-1 | 6 | 14.36 | 1.76 | 7.44% | 5.06% | 5.46% |
| 6-2 | 6 | 14.36 | 3.52 | 6.71% | 4.56% | 9.84% |
| 7-1 | 7 | 25.02 | 1.76 | 1.08% | 6.09% | 3.29% |
| 7-2 | 7 | 25.02 | 3.52 | 1.01% | 5.72% | 6.17% |
| 8-1 | 8 | 25.15 | 1.76 | 0.54% | 6.07% | 3.27% |
| 9-1 | 9 | 25.10 | 1.76 | 2.23% | 3.04% | 3.28% |
| 10-1 | 10 | 23.19 | 1.76 | 2.40% | 3.27% | 3.53% |
| 10-2 | 10 | 23.19 | 3.52 | 2.25% | 3.05% | 6.59% |
| 11-1 | 11 | 20.17 | 1.76 | 2.74% | 3.72% | 4.01% |
| 11-2 | 11 | 20.17 | 3.52 | 2.53% | 3.45% | 7.43% |
| 12-1 | 12 | 22.52 | 1.76 | 2.47% | 3.36% | 3.62% |
| 12-2 | 12 | 22.52 | 3.52 | 2.30% | 3.13% | 6.76% |
| 13-1 | 13 | 22.05 | 1.76 | 1.21% | 3.43% | 3.70% |
| 13-2 | 13 | 22.05 | 3.52 | 1.13% | 3.19% | 6.88% |
| 14-1 | 14 | 22.86 | 1.76 | 9.75% | 3.31% | 3.57% |

TABLE 4

| | | Optical properties of resin-containing liquid composition | | | |
|---|---|---|---|---|---|
| Resin-containing liquid composition | Liquid composition used | UV cut-off wavelength [nm] | IR cutt-off wavelength [nm] | Average transmittance in wavelength range of 300 to 350 nm [%] | Average transmittance in wavelength range of 300 to 370 [%] |
| 1-1 | 1 | 402 | 631 | 0.0 | 0.1 |
| 1-2 | 1 | 401 | 631 | 0.0 | 0.1 |
| 2-1 | 2 | 397 | 661 | 0.1 | 0.7 |
| 2-2 | 2 | 397 | 660 | 0.1 | 0.8 |
| 3-1 | 3 | 392 | 671 | 0.1 | 0.8 |
| 3-2 | 3 | 393 | 667 | 0.0 | 0.7 |
| 4-1 | 4 | 404 | 627 | 0.0 | 0.1 |
| 4-2 | 4 | 404 | 625 | 0.0 | 0.1 |
| 5-1 | 5 | 406 | 620 | 0.0 | 0.0 |
| 5-2 | 5 | 406 | 619 | 0.0 | 0.0 |
| 6-1 | 6 | 409 | 613 | 0.0 | 0.0 |
| 6-2 | 6 | 407 | 613 | 0.0 | 0.0 |
| 7-1 | 7 | 402 | 619 | 0.0 | 0.2 |
| 7-2 | 7 | 403 | 623 | 0.0 | 0.2 |

TABLE 4-continued

| | | | | | |
|---|---|---|---|---|---|
| 8-1 | 8 | 408 | 605 | 0.0 | 0.1 |
| 9-1 | 9 | 402 | 636 | 0.0 | 0.1 |
| 10-1 | 10 | 402 | 632 | 0.0 | 0.1 |
| 10-2 | 10 | 401 | 632 | 0.0 | 0.1 |
| 11-1 | 11 | 403 | 634 | 0.0 | 0.0 |
| 11-2 | 11 | 403 | 633 | 0.0 | 0.1 |
| 12-1 | 12 | 399 | 645 | 0.0 | 0.1 |
| 12-2 | 12 | 399 | 645 | 0.0 | 0.1 |
| 13-1 | 13 | 405 | 637 | 0.0 | 0.0 |
| 13-2 | 13 | 405 | 643 | 0.0 | 0.1 |
| 14-1 | 14 | 399 | 659 | 0.0 | 0.3 |

| | Optical properties of resin-containing liquid composition | | | | |
|---|---|---|---|---|---|
| Resin-containing liquid composition | Average transmittance in wavelength range of 400 to 600 nm [%] | Average transmittance in wavelength range of 450 to 600 nm [%] | Transmittance at wavelength of 800 nm [%] | Transmittance at wavelength of 900 nm [%] | Transmittance at wavelength of 1100 nm [%] |
| 1-1 | 81.7 | 84.7 | 4.4 | 5.1 | 18.6 |
| 1-2 | 82.6 | 85.4 | 5.3 | 6.2 | 20.8 |
| 2-1 | 81.8 | 84.7 | 19.0 | 22.1 | 42.8 |
| 2-2 | 80.4 | 83.5 | 19.9 | 22.8 | 43.6 |
| 3-1 | 87.0 | 89.0 | 15.8 | 16.6 | 36.0 |
| 3-2 | 86.6 | 88.6 | 15.3 | 16.1 | 35.5 |
| 4-1 | 80.9 | 84.3 | 3.7 | 5.4 | 20.0 |
| 4-2 | 80.5 | 83.8 | 4.6 | 6.2 | 22.5 |
| 5-1 | 80.0 | 83.8 | 1.4 | 1.8 | 10.0 |
| 5-2 | 80.0 | 83.6 | 1.9 | 2.5 | 12.2 |
| 6-1 | 78.8 | 82.8 | 0.7 | 1.1 | 7.7 |
| 6-2 | 79.2 | 83.0 | 1.1 | 1.5 | 9.8 |
| 7-1 | 79.9 | 82.9 | 7.1 | 9.7 | 28.0 |
| 7-2 | 78.6 | 81.9 | 8.0 | 10.6 | 29.4 |
| 8-1 | 73.8 | 77.4 | 6.8 | 10.3 | 29.8 |
| 9-1 | 83.2 | 86.4 | 5.3 | 6.4 | 22.0 |
| 10-1 | 82.3 | 85.4 | 4.0 | 5.3 | 18.7 |
| 10-2 | 82.4 | 85.3 | 4.8 | 6.9 | 20.8 |
| 11-1 | 82.0 | 85.4 | 3.0 | 3.7 | 16.4 |
| 11-2 | 82.1 | 85.4 | 3.8 | 4.7 | 18.7 |
| 12-1 | 84.6 | 87.3 | 3.8 | 4.7 | 19.7 |
| 12-2 | 84.9 | 87.5 | 4.6 | 5.4 | 21.8 |
| 13-1 | 80.6 | 84.5 | 4.0 | 5.1 | 20.4 |
| 13-2 | 78.7 | 82.7 | 4.7 | 5.9 | 24.6 |
| 14-1 | 80.5 | 84.5 | 4.6 | 6.3 | 33.0 |

TABLE 5

| Example | Resin-containing liquid composition | UV cut-off wavelength [nm] | IR cut-off wavelength [nm] | Average transmittance in wavelength range of 300 350 nm [%] | Average transmittance in wavelength range of 300 370 [%] | Average transmittance in wavelength range of 400 to 600 nm [%] |
|---|---|---|---|---|---|---|
| 1 | 1-1 | 391 | 663 | 0.1 | 0.6 | 86.7 |
| 2 | 1-2 | 402 | 633 | 0.0 | 0.0 | 81.0 |
| 3 | 2-1 | 402 | 651 | 0.3 | 0.3 | 80.1 |
| 4 | 2-2 | 401 | 655 | 0.0 | 0.1 | 81.0 |
| 5 | 3-1 | 394 | 670 | 0.0 | 0.5 | 83.2 |
| 6 | 3-2 | 389 | 683 | 0.1 | 1.5 | 85.1 |
| 7 | 4-1 | 395 | 654 | 0.1 | 0.3 | 84.1 |
| 8 | 4-2 | 397 | 649 | 0.0 | 0.2 | 83.7 |
| 9 | 5-1 | 407 | 633 | 0.0 | 0.0 | 79.8 |
| 10 | 5-2 | 400 | 645 | 0.0 | 0.0 | 84.1 |
| 11 | 6-1 | 401 | 635 | 0.0 | 0.0 | 82.4 |
| 12 | 6-2 | 403 | 631 | 0.0 | 0.0 | 81.3 |
| 13 | 7-1 | 405 | 634 | 0.0 | 0.0 | 81.4 |
| 14 | 7-2 | 400 | 630 | 0.0 | 0.0 | 80.9 |
| 15 | 8-1 | 411 | 612 | 0.1 | 0.1 | 75.8 |
| 16 | 9-1 | 193 | 672 | 0.1 | 0.8 | 86.9 |
| 17 | 10-1 | 192 | 662 | 0.0 | 0.5 | 87.0 |
| 18 | 10-2 | 406 | 628 | 0.0 | 0.0 | 79.1 |
| 19 | 11-1 | 401 | 646 | 0.0 | 0.0 | 83.2 |
| 20 | 11-2 | 410 | 628 | 0.0 | 0.0 | 77.6 |
| 21 | 12-1 | 399 | 650 | 0.0 | 0.0 | 84.0 |
| 22 | 12-2 | 402 | 646 | 0.0 | 0.0 | 82.1 |
| 23 | 13-1 | 414 | 622 | 0.0 | 0.0 | 75.3 |

TABLE 5-continued

| | | | | | | |
|---|---|---|---|---|---|---|
| 24 | 13-2 | 413 | 622 | 0.1 | 0.1 | 76.0 |
| 25 | 14-1 | 391 | 688 | 0.3 | 2.3 | 80.2 |

| Example | Average transmittance in wavelength range of 450 to 600 nm [%] | Transmittance at wavelength of 800 nm [%] | Transmittance at wavelength of 900 nm [%] | Transmittance at wavelength of 1100 nm [%] | Thickness of light-absorbing film [μm] |
|---|---|---|---|---|---|
| 1 | 88.6 | 8.6 | 9.5 | 31.6 | 165 |
| 2 | 84.4 | 1.3 | 1.4 | 11.8 | 170 |
| 3 | 84.2 | 6.7 | 10.5 | 45.9 | 54 |
| 4 | 84.7 | 9.1 | 11.4 | 31.9 | 67 |
| 5 | 85.8 | 7.3 | 9.7 | 46.5 | 117 |
| 6 | 87.1 | 15.1 | 19.6 | 56.6 | 92 |
| 7 | 86.7 | 4.2 | 6.6 | 35.5 | 68 |
| 8 | 86.4 | 4.3 | 6.5 | 30.5 | 92 |
| 9 | 84.5 | 0.0 | 0.0 | 10.1 | 234 |
| 10 | 87.4 | 0.6 | 1.2 | 22.7 | 140 |
| 11 | 85.5 | 0.5 | 0.8 | 11.2 | 96 |
| 12 | 84.6 | 0.5 | 1.0 | 8.8 | 94 |
| 13 | 85.3 | 2.1 | 4.1 | 26.9 | 96 |
| 14 | 85.1 | 2.1 | 3.5 | 24.5 | 127 |
| 15 | 80.6 | 1.5 | 2.8 | 13.4 | 107 |
| 16 | 88.6 | 11.1 | 15.4 | 51.4 | 63 |
| 17 | 89.0 | 5.7 | 8.3 | 40.1 | 73 |
| 18 | 83.2 | 0.3 | 1.0 | 8.4 | 175 |
| 19 | 86.6 | 1.1 | 1.7 | 24.2 | 87 |
| 20 | 82.7 | 0.1 | 0.3 | 9.5 | 216 |
| 21 | 87.0 | 2.1 | 2.1 | 21.7 | 119 |
| 22 | 85.7 | 1.5 | 1.5 | 19.2 | 100 |
| 23 | 80.7 | 0.4 | 0.3 | 9.2 | 104 |
| 24 | 81.4 | 0.5 | 1.0 | 10.8 | 160 |
| 25 | 83.8 | 18.3 | 21.7 | 55.1 | 44 |

TABLE 6

| Wavelength [nm] | Transmittance [%] | Wavelength [nm] | Transmittance [%] |
|---|---|---|---|
| 300 | 5.2 | 740 | 91.8 |
| 310 | 33.0 | 760 | 91.9 |
| 320 | 66.4 | 780 | 91.6 |
| 330 | 82.5 | 800 | 91.9 |
| 340 | 88.1 | 820 | 91.7 |
| 350 | 90.0 | 840 | 91.9 |
| 360 | 90.8 | 860 | 92.1 |
| 370 | 90.6 | 880 | 92.1 |
| 400 | 91.0 | 900 | 92.0 |
| 420 | 91.2 | 920 | 92.2 |
| 440 | 91.3 | 940 | 92.0 |
| 460 | 91.4 | 960 | 92.0 |
| 480 | 91.4 | 980 | 92.0 |
| 500 | 91.5 | 1000 | 92.0 |
| 520 | 91.4 | 1020 | 91.9 |
| 540 | 91.5 | 1040 | 92.0 |
| 560 | 91.6 | 1060 | 92.0 |
| 580 | 91.6 | 1080 | 91.9 |
| 600 | 91.7 | 1100 | 91.9 |
| 620 | 91.9 | 1120 | 91.8 |
| 640 | 91.8 | 1140 | 92.0 |
| 660 | 91.8 | 1160 | 92.0 |
| 680 | 91.9 | 1180 | 92.1 |
| 700 | 91.8 | 1200 | 92.1 |
| 720 | 91.8 | | |

The invention claimed is:

1. A liquid composition, comprising:
   a light absorber including a phosphonic acid and copper ion, the phosphonic acid having an aryl group bonded to a phosphorus atom;
   at least one selected from the group consisting of an alkoxysilane and a hydrolysate of an alkoxysilane;
   a phosphoric acid ester; and
   a solvent including a first organic solvent, wherein
   a content of the first organic solvent having a relative permittivity of 7 or less at 20° C. is 20 mass % or less.

2. The liquid composition according to claim 1, wherein the alkoxysilane and the hydrolysate of an alkoxysilane have a non-reactive hydrophobic group bonding to a silicon atom.

3. The liquid composition according to claim 1, the solvent further including a second organic solvent having a relative permittivity of more than 7 at 20° C.

4. The liquid composition according to claim 1, wherein the phosphoric acid ester has an HLB value of 7 to 16.

5. The liquid composition according to claim 1, wherein a transmitted light incident on the liquid composition has a transmittance spectrum that satisfies the following requirements (i) and (ii):
   (i) the spectral transmittance increases with increasing wavelength in a wavelength range of 350 nm to 450 nm and an ultraviolet cut-off wavelength which lies in the wavelength range of 350 nm to 450 nm and at which the transmittance is 50% is in a wavelength range of 380 nm to 420 nm; and
   (ii) the spectral transmittance decreases with increasing wavelength in a wavelength range of 600 nm to 800 nm and an infrared cut-off wavelength which lies in the wavelength range of 600 nm to 800 nm and at which the transmittance is 50% is in a wavelength range of 600 nm to 690 nm.

6. The liquid composition according to claim 5, wherein the average transmittance in a wavelength range of 300 nm to 350 nm is 1% or less in the transmittance spectrum.

7. The liquid composition according to claim 5, wherein the average transmittance in a wavelength range of 300 nm to 370 nm is 2% or less in the transmittance spectrum.

8. The liquid composition according to claim 5, wherein the average transmittance in a wavelength range of 400 nm to 600 nm is 70% or more in the transmittance spectrum.

9. The liquid composition according to claim 5, wherein the average transmittance in a wavelength range of 450 nm to 600 nm is 70% or more in the transmittance spectrum.

10. The liquid composition according to claim 5, wherein the transmittance at a wavelength of 800 nm is 20% or less in the transmittance spectrum.

11. The liquid composition according to claim 5, wherein the transmittance at a wavelength of 900 nm is 25% or less in the transmittance spectrum.

12. The liquid composition according to claim 5, wherein the transmittance at a wavelength of 1100 nm is 45% or less in the transmittance spectrum.

13. The liquid composition according to claim 5, wherein the transmittance at a wavelength of 1300 nm is 70% or less in the transmittance spectrum.

14. An optical filter comprising:
   a light-absorbing film including a cured product of the liquid composition according to claim 1, the light-absorbing film having a thickness of 40 μm to 250 μm, wherein
   a transmitted light incident on the optical filter has a transmittance spectrum that satisfies the following requirements (I) and (II):
   (I) the spectral transmittance increases with increasing wavelength in a wavelength range of 350 nm to 450 nm and an ultraviolet cut-off wavelength which lies in the wavelength range of 350 nm to 450 nm and at which the transmittance is 50% is in a wavelength range of 380 nm to 420 nm; and
   (II) the spectral transmittance decreases with increasing wavelength in a wavelength range of 600 nm to 800 nm and an infrared cut-off wavelength which lies in the wavelength range of 600 nm to 800 nm and at which the transmittance is 50% is in a wavelength range of 600 nm to 690 nm.

15. The optical filter according to claim 14, wherein the average transmittance in a wavelength range of 300 nm to 350 nm is 1% or less in the transmittance spectrum.

16. The optical filter according to claim 14, wherein the average transmittance in a wavelength range of 300 nm to 370 nm is 3% or less in the transmittance spectrum.

17. The optical filter according to claim 14, wherein the average transmittance in a wavelength range of 400 nm to 600 nm is 70% or more in the transmittance spectrum.

18. The optical filter according to claim 14, wherein the average transmittance in a wavelength range of 450 nm to 600 nm is 70% or more in the transmittance spectrum.

19. The optical filter according to claim 14, wherein the transmittance spectrum satisfies any one of the following requirements (IIIa), (IIIb), and (IIIc):
   (IIIa) the transmittance at a wavelength of 800 nm is 25% or less in the transmittance spectrum;
   (IIIb) the transmittance at a wavelength of 900 nm is 25% or less in the transmittance spectrum; and
   (IIIc) the transmittance at a wavelength of 1100 nm is 60% or less in the transmittance spectrum.

20. The optical filter according to claim 14, further comprising a transparent substrate on which the light-absorbing filmi provided, the transparent substrate having a minimum transmittance of 70% in a wavelength range of 450 nm to 600 nm.

21. The liquid composition according to claim 1, further comprising:
   a curable resin; wherein
   the liquid composition is capable of curing into a light-absorbing film.

22. The liquid composition according to claim 1, wherein a content of the first organic solvent having a relative permittivity of 7 or less at 20° C. is 6.90 mass % or less.

* * * * *